(12) United States Patent
Yoshioka et al.

(10) Patent No.: US 9,524,446 B2
(45) Date of Patent: Dec. 20, 2016

(54) IMAGE PROCESSING DEVICE AND IMAGE PROCESSING METHOD

(71) Applicant: FUJITSU LIMITED, Kawasaki-shi, Kanagawa (JP)

(72) Inventors: Takahiro Yoshioka, Tachikawa (JP); Satoshi Nakashima, Kawasaki (JP); Junichi Odagiri, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/520,565

(22) Filed: Oct. 22, 2014

(65) Prior Publication Data

US 2015/0161472 A1     Jun. 11, 2015

(30) Foreign Application Priority Data

Dec. 9, 2013   (JP) .................................. 2013-254308

(51) Int. Cl.
     *G06K 9/00*          (2006.01)
     *H04N 15/00*       (2006.01)
     *G06K 9/52*          (2006.01)
     *G06K 9/46*          (2006.01)

(52) U.S. Cl.
     CPC ............... *G06K 9/52* (2013.01); *G06K 9/0061* (2013.01); *G06K 9/4661* (2013.01)

(58) Field of Classification Search
     CPC ...... G06K 9/6202; G06K 9/6203; G06K 9/00; G06T 3/4069; G06T 7/001; G06F 17/30256
     USPC ............ 382/197, 103, 100, 117; 348/43, 51, 348/E13.001, E13.058, E13.059, E13.071, 348/E13.014, E13.038, E13.04, 53; 345/629, 7, 630, 418, 619; 359/462, 466, 359/477, 601, 350
     See application file for complete search history.

(56) References Cited

U.S. PATENT DOCUMENTS

| | | | |
|---|---|---|---|
| 5,036,347 A * | 7/1991 | Tsunekawa | ............ A61B 3/112 396/121 |
| 6,152,563 A | 11/2000 | Hutchinson et al. | |
| 7,486,806 B2 * | 2/2009 | Azuma | .............. G06K 9/00597 340/5.82 |

(Continued)

FOREIGN PATENT DOCUMENTS

| | | |
|---|---|---|
| JP | 10-99275 | 4/1998 |
| JP | 2000-70225 | 3/2000 |
| WO | WO2011/158463 | 8/2013 |

OTHER PUBLICATIONS

Extended European Search Report issued Jun. 25, 2015 in corresponding European Patent Application No. 14189931.0.

(Continued)

*Primary Examiner* — Sheela C Chawan
(74) *Attorney, Agent, or Firm* — Staas & Halsey LLP

(57) ABSTRACT

An image processing device includes a processor; and a memory which stores a plurality of instructions, which when executed by the processor, cause the processor to execute: determining whether or not an eye region of a user being detected a line-of-sight in an image resulting from photographing an eye of the user is influenced by reflection light, the eye region being a region of the eye; and detecting, as a feature portion of the eye, a region that is included in the eye region and that includes a pixel having a feature that is the same as or similar to any of features of the feature portion, when it is determined that the eye region is influenced by the reflection light, the features being accumulated for respective strengths of influences of the reflection light that appear in images of the feature portion of the eye.

19 Claims, 19 Drawing Sheets

(56) References Cited

U.S. PATENT DOCUMENTS

| | | | |
|---|---|---|---|
| 8,406,479 B2* | 3/2013 | Tsukizawa | A61B 3/113 340/5.83 |
| 8,659,751 B2* | 2/2014 | Tsukizawa | G06T 1/00 356/124 |
| 8,824,779 B1* | 9/2014 | Smyth | G06K 9/0061 382/100 |
| 9,149,179 B2* | 10/2015 | Barnard | A61B 3/0025 |
| 2006/0147094 A1* | 7/2006 | Yoo | G06K 9/00604 382/117 |
| 2009/0304232 A1 | 12/2009 | Tsukizawa | |
| 2012/0170027 A1* | 7/2012 | Tsukizawa | G06T 1/00 356/124 |
| 2012/0177266 A1 | 7/2012 | Tsukizawa et al. | |
| 2014/0078282 A1* | 3/2014 | Aoki | G06K 9/00221 348/78 |

OTHER PUBLICATIONS

Feng Li et al., "Using Structured Illumination to Enhance Video-Based Eye Tracking", International Conference on Image Processing, ICIP 2007, Sep. 1, 2007, pp. 373-376.

Ashit Talukder et al., "Eye-tracking architecture for biometrics and remote monitoring", Applied Optics, Feb. 10, 2005, vol. 44, No. 5, pp. 693-700.

Su Yeong Gwon et al., "Robust Eye and Pupil Detection Method for Gaze Tracking", International Journal of Advanced Robotic Systems, INTECH, Int J Adv Robotic Sy, 2013, vol. 10, 98:2013, www.intechopen.com, pp. 1-7.

* cited by examiner

FIG. 3

| BRIGHTNESS OF PUPIL | BRIGHTNESS OF IRIS |
|---|---|
| Bp1 | Bs1 |
| • | • |
| • | • |
| Bp2 | Bs2 |
| • | • |
| • | • |
| • | • |

FIG. 14

| POSITION OF RIGHT PUPIL | POSITION OF RIGHT PURKINJE IMAGE | POSITION OF LEFT PUPIL | POSITION OF LEFT PURKINJE IMAGE |
|---|---|---|---|
| XRp1,YRp1 | XRr1,YRr1 | XLp1,YLp1 | XLr1,YLr1 |
| • | • | • | • |
| • | • | • | • |
| • | • | • | • |

FIG. 17

| FEATURE VALUE OF IRIS | | FEATURE VALUE OF SCLERA | |
|---|---|---|---|
| BRIGHTNESS VALUE | CHROMATICITY VALUE | BRIGHTNESS VALUE | CHROMATICITY VALUE |
| Bs1 | Crs1,Cbs1 | Bw1 | Crw1,Cbw1 |
| • | • | • | • |
| • | • | • | • |
| • | • | • | • |

IMAGE PROCESSING DEVICE AND IMAGE PROCESSING METHOD

CROSS-REFERENCE TO RELATED APPLICATION

This application is based upon and claims the benefit of priority of the prior Japanese Patent Application No. 2013-254308 filed on Dec. 9, 2013, the entire contents of which are incorporated herein by reference.

FIELD

The embodiments discussed herein are related to an image processing device, an image processing method, and an image processing program.

BACKGROUND

A technology has been proposed in which the pupil or the iris and a Purkinje image indicating reflection on the cornea are detected from an eye region in an image resulting from photographing the face of a person, and the person's line-of-sight is detected based on the positional relationship between the detected Purkinje image and the center of the detected pupil or iris.

For example, Japanese Laid-open Patent Publication No. 2000-070225 discloses an eyeglass-type line-of-sight detecting device having a light projecting element and an image capture element whose positions are fixed relative to the eyeballs of a person. In this scheme, when the eyeglass-type line-of-sight detecting device fails to detect a Purkinje image during detection of the person's line-of-sight, it detects the line-of-sight by using a Purkinje image detected in advance.

For a line-of-sight detecting device that detects the line-of-sight direction of a user of a computer or the like, for example, a display apparatus coupled to the computer or the like or a display unit of a smartphone, tablet terminal, or the like is provided with an image capture element and a lighting element. In such a line-of-sight detecting device, there is a possibility that the positional relationship between the image capture element and the lighting element and the eyeballs of a person varies. In addition, in such a line-of-sight detecting device, when external light, light radiated from a display apparatus, or the like is reflected on eyeglasses worn by the person, it is difficult to detect the position of the pupil in some cases. When the positions of the pupil and a Purkinje image that are detected in the state in which external light or the like is reflected on the eyeglasses are used for processing for determining the line-of-sight direction of the person, an error occurs in the detected line-of-sight direction of the person.

Accordingly, for example, Domestic Re-publication of PCT International Publication for Patent Application No. 2011/158463 discloses a line-of-sight detecting device for reducing determination errors in the line-of-sight direction. The line-of-sight detecting device stops processing for detecting the line-of-sight, upon detecting the occurrence of reflection of external light or the like on eyeglasses, and performs the processing for determining the line-of-sight when there is no reflection of external light or the like.

SUMMARY

In accordance with an aspect of the embodiments, an image processing device includes a processor; and a memory which stores a plurality of instructions, which when executed by the processor, cause the processor to execute: determining whether or not an eye of a user being detected a line-of-sight region in an image resulting from photographing an eye of the user is influenced by reflection light, the eye region being a region of the eye; and detecting, as a feature portion of the eye, a region that is included in the eye region and that includes a pixel having a feature that is the same as or similar to any of features of the feature portion, when it is determined that the eye region is influenced by the reflection light, the features being accumulated for respective strengths of influences of the reflection light that appear in images of the feature portion of the eye.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 3 illustrates an example of an accumulation unit illustrated in FIG. 1;

FIG. 14 illustrates an example of a collecting unit illustrated in FIG. 13;

FIG. 17 illustrates an example of an accumulation unit illustrated in FIG. 16;

DESCRIPTION OF EMBODIMENTS

Figure 1:
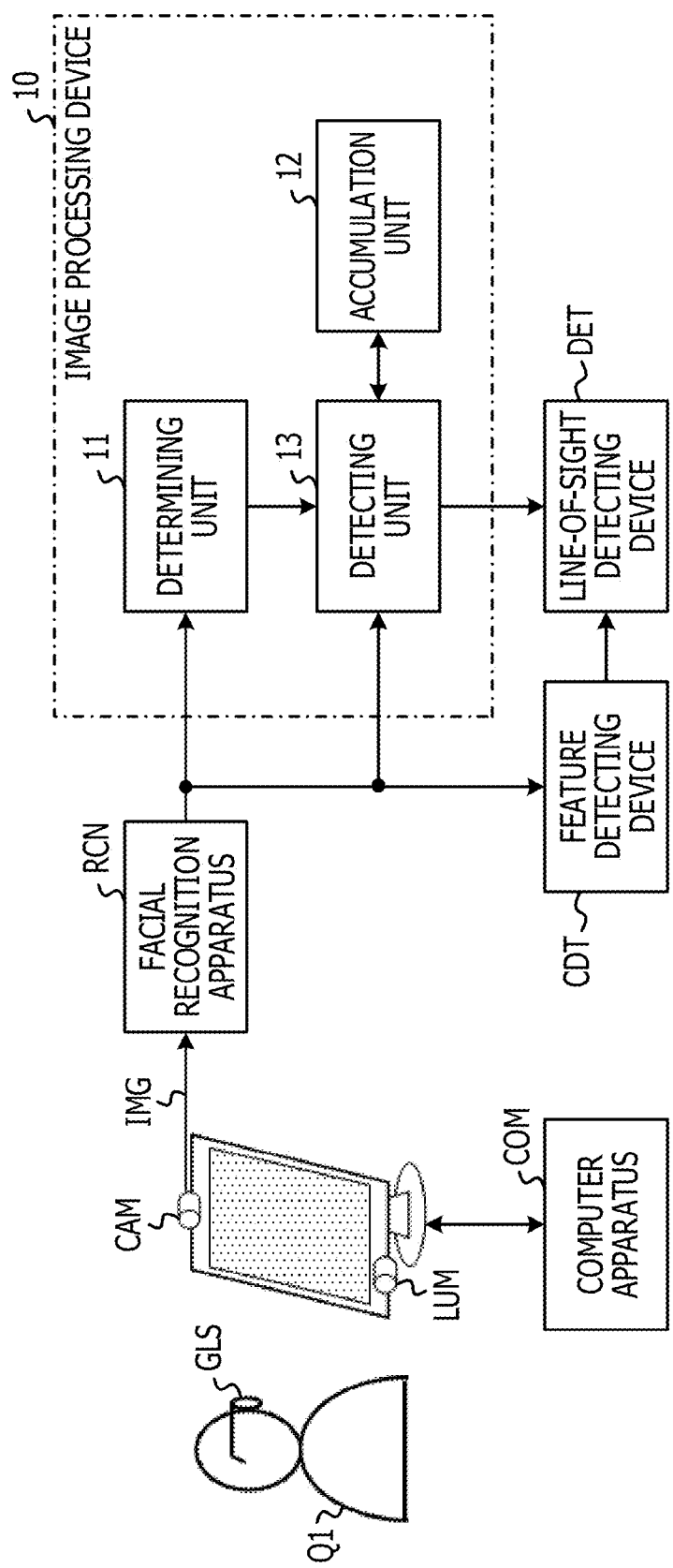
FIG. 1 illustrates an embodiment of an image processing device.

FIG. 1 illustrates an embodiment of an image processing device. The image processing device 10 illustrated in FIG. 1 includes a determining unit 11, an accumulation unit 12, and a detecting unit 13. Functions and operations of the determining unit 11, the accumulation unit 12, and the detecting unit 13 included in the image processing device 10 are described later with reference to FIGS. 2 to 4.

A display apparatus DSP illustrated in FIG. 1 is coupled to a computer apparatus COM. A photographic device CAM and a light source LUM are fixed to the display apparatus DSP. The light source LUM is, for example, a light-emitting diode (LED) that emits near-infrared light or the like and is fixed in a direction for illuminating the face of person Q1 who is present at a position facing the display apparatus DSP. The photographic device CAM is a camera having sensitivity to light in a wavelength band emitted by the light source LUM and is arranged in a direction for photographing the face of the person Q1 from approximately the front to photograph a predetermined range including the face of the person Q1.

The computer apparatus COM may be a desktop computer apparatus COM, and the photographic device CAM and the light source LUM may be built into the display apparatus DSP coupled to the desktop computer apparatus COM. The computer apparatus COM may be a notebook computer apparatus, and the photographic device CAM and the light source LUM may be fixed to a display unit included therein. The computer apparatus COM may also be mobile terminal equipment, such as a smartphone or tablet terminal, and the photographic device CAM and the light source LUM may be fixed to a display unit included therein. The photographic device CAM and the light source LUM may be fixed to a display unit of a vehicle-mounted apparatus, such as a car navigation system, attached to the dashboard or the like of a vehicle or may be fixed to not only a display unit but also a portion in front of the driver. Similarly, the photographic device CAM and the light source LUM may be built into a display unit included in a notebook computer apparatus or may be built into a display unit included in mobile terminal equipment, such as a smartphone or tablet terminal, or a vehicle-mounted apparatus.

In the example illustrated in FIG. 1, the photographic device CAM is arranged at a center portion on the upper side of the display apparatus DSP, which has a rectangular shape, and the light source LUM is arranged at a center portion on the lower side of the display apparatus DSP. The photographic device CAM and the light source LUM may also be placed at positions where the photographic device CAM may photograph the eyes of the person Q1, who is a subject, for example, positions in front of the subject.

A facial recognition apparatus RCN receives an image IMG including the face of the person Q1 photographed by the photographic device CAM and performs facial recognition processing on the received image IMG to thereby detect feature portions of the face of the person Q1 which include both eyes of the person Q1. The facial recognition apparatus RCN also extracts two eye regions, which are regions including the two eyes of the person Q1, from the image IMG and passes the images of the extracted eye regions to the image processing device 10 and a feature detecting device CDT. A method for detecting facial feature portions including both eyes of the person Q1 is not limited to a method involving facial recognition processing and may be a method for directly detecting facial feature portions including both eyes from the image IMG.

Using a technology similar to those in the related art, the feature detecting device CDT detects the pupils and irises from the two eye regions as feature portions of the eyes of the person Q1 and passes the positions of the detected feature portions to a line-of-sight detecting device DET. For example, the feature detecting device CDT detects edges indicating a brightness difference between the pupil and the iris in a state in which each of the eye regions is not influenced by external light reflected by a reflecting member, such as eyeglasses GLS, and detects, as the pupil, a portion in which the detected edges are distributed in the form of a circle. Upon detecting the pupil from at least one of the two eye regions, the feature detecting device CDT passes, for example, information indicating the position(s) of the center(s) of a circle or circles representing the pupil(s) to the line-of-sight detecting device DET as information indicating the position(s) of the detected pupil(s). The feature detecting device CDT also detects, for example, from the two eye regions, respective Purkinje images resulting from light from the light source LUM being reflected on the surfaces of the corneas, which are parts of the eyeballs of the person Q1, and passes information indicating the positions of the centers of the detected Purkinje images to the line-of-sight detecting device DET. In this case, in each of the two eye regions, the Purkinje image appears as a circular region whose brightness is higher than those of other regions. Accordingly, regardless of whether or not each eye region is influenced by external light or the like reflected by a reflecting member, such as the eyeglasses GLS, the feature detecting device CDT may detect a Purkinje image from each eye region.

On the other hand, when the feature detecting device CDT fails to detect the pupils from both of the eye regions, the image processing device 10 locates the position(s) of the pupil(s) of at least one of the two eye regions by performing processing described below with reference to FIGS. 2 to 5. The image processing device 10 then passes information indicating the located position(s) to the line-of-sight detecting device DET.

Based on the feature-portion position(s) received from the feature detecting device CDT or the image processing device 10 or the Purkinje image positions received from the feature detecting device CDT, the line-of-sight detecting device DET performs processing for detecting a line-of-sight direction of the person Q1. The line-of-sight detecting device DET has pre-obtained information indicating a positional relationship between the light source LUM and the photographic device CAM included in the display apparatus DSP and uses the obtained information to perform processing for detecting the line-of-sight direction. The line-of-sight direction detected by the line-of-sight detecting device DET is used, for example, to locate, on a display screen of the display apparatus DSP the position at which the person Q1 gazes.

The facial recognition apparatus RCN and the feature detecting device CDT may also be included in the image processing device 10. The image processing device 10 may also be included in the line-of-sight detecting device DET. In addition, the facial recognition apparatus RCN, the feature detecting device CDT, the image processing device 10, and the line-of-sight detecting device DET may also be included in the computer apparatus COM.

When a reflecting member, such as the eyeglasses GLS, exists in front of the eyeballs of the person Q1 illustrated in FIG. 1, there are cases in which feature values, such as brightness values of pixels in the eye regions included in the image IMG captured by the photographic device CAM, are influenced by, for example, external light reflected by the reflecting member. The term "external light" as used herein refers to light from a light source that exists in the vicinity of the person Q1, except for the light source LUM. Examples of the external light include the sun's rays and light radiated by lighting equipment in a room or the display apparatus DSP. The feature values of the pixels in the eye regions may include components indicating the intensities of light from the light source LUM which is diffused by a reflecting member, such as the eyeglasses GLS, situated in front of the eyeballs, and also, in such cases, the images of the eye regions do not faithfully indicate features of both eyes of the person Q1. In the following description, when the components of external light reflected by a reflecting member, such as the eyeglasses GLS, or the components of light from the light source LUM which is diffused thereby are included in the feature values of the pixels in the corresponding eye regions, it is said that the eye regions are influenced by reflection light.

Figure 2:
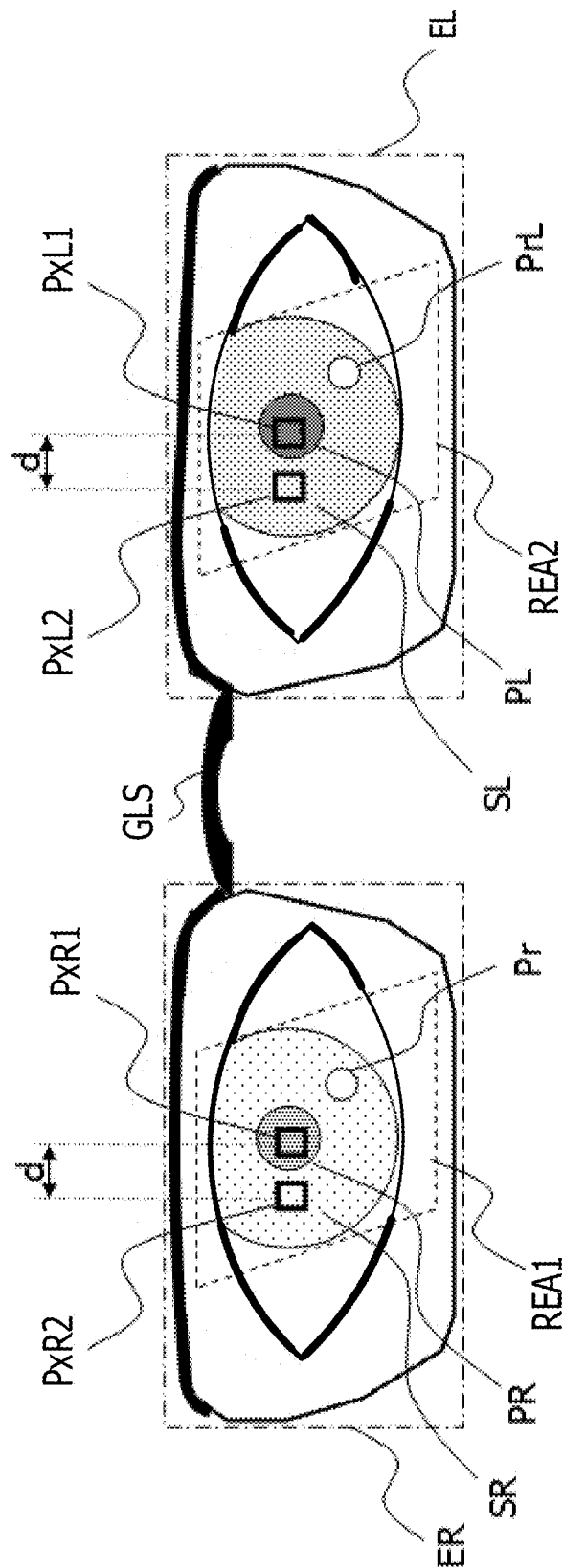
FIG. 2 illustrates an example of eye regions included in an image illustrated in FIG. 1.

FIG. 2 illustrates an example of eye regions included in the image IMG illustrated in FIG. 1. In FIG. 2, rectangular regions EL and ER surrounded by dashed-dotted lines represent eye regions extracted from the image IMG via the facial recognition processing performed by the facial recognition apparatus RCN.

In the example illustrated in FIG. 2, the eye region EL includes the left eye of the person Q1 and a left lens of the eyeglasses GLS, and the eye region ER includes the right eye of the person Q1 and a right lens of the eyeglasses GLS. In the eye region EL illustrated in FIG. 2, a circular pattern PL represents the left pupil of the person Q1, and a region SL surrounding the pupil PL represents the left iris of the person Q1. In the eye region EL illustrated in FIG. 2, a circular pattern PrL represents a Purkinje image that appears as a result of light from the light source LUM illustrated in FIG. 1 being reflected on the surface of the cornea in the left eyeball of the person Q1. Similarly, in the eye region ER illustrated in FIG. 2, a circular pattern PR represents the right pupil of the person Q1, and a region SR surrounding the pupil PR represents the right iris of the person Q1. In the eye region ER illustrated in FIG. 2, a circular pattern PrR represents a Purkinje image that appears as a result of light from the light source LUM being reflected on the surface of the cornea in the right eyeball of the person Q1. The dashed-dotted lines denoting the eye regions EL and ER are depicted in FIG. 2 for the sake of explanation and are not included in the image IMG.

In the respective eye regions ER and EL illustrated in FIG. 2, parallelograms REA1 and REA2 surrounded by dashed lines represent examples of regions influenced by reflection light reflected by a reflecting member, such as the eyeglasses GLS. That is, the example in FIG. 2 is an example in which both of the eye regions EL and ER are influenced by reflection light. In the example in FIG. 2, a difference between the strength of the influence of reflection light on the region REA1 and the strength of the influence of reflection light on the region REA2 is indicated by a difference in the density of hatching applied to graphics representing the pupils PR and PL and the irises SR and SL. The dashed lines denoting the regions REA1 and REA2 that are influenced by reflection light in the eye regions EL and ER illustrated in FIG. 2 are depicted for the sake of explanation and are not included in the image IMG.

The shapes of the regions REA1 and REA2 are not limited to the parallelograms illustrated in FIG. 2 and may be indefinite shapes, and the magnitudes of components due to reflection light which are included in the brightness values of the pixels in the regions REA1 and REA2 may be different from one pixel to another. This is because the intensity of reflection light that occurs as a result of reflection of external light, such as light radiated from the display screen of the display apparatus DSP illustrated in FIG. 1 or the sun's ray, on a reflecting member, such as the eyeglasses GLS, changes to various levels, depending on the brightness of the external light, the angle of incidence of the external light, and so on.

The brightness values of the pixels included in the regions REA1 and REA2 illustrated in FIG. 2 are values corresponding to a strength indicated by the sum of the intensity of reflection light from the surfaces of the eyeballs of the person Q1 and the intensity of reflection light reflected by a reflecting member, such as the lenses of the eyeglasses GLS. Consequently, the brightnesses of the images inside the regions REA1 and REA2 are generally higher than a case in which the eye regions are not influenced by reflection light reflected by the lenses of the eyeglasses GLS or the like. When the pupil PL of the left eye illustrated in FIG. 2 is included in the region REA2, a difference between the brightness values of pixels inside the pupil PL and the brightness values of pixels outside the pupil PL becomes small in many cases, compared with a case in which the eye regions are not influenced by reflection light reflected by the lenses or the like.

Thus, as illustrated in FIG. 2, when each of the eye regions EL and ER is influenced by reflection light reflected by a reflecting member situated in front of the eyeballs, it is difficult for the feature detecting device CDT illustrated in FIG. 1 to detect the pupils PL and PR or irises SL and SR from the eye regions EL and ER.

Accordingly, in the image processing device 10 illustrated in FIG. 1, when the determining unit 11 determines that the eye regions EL and ER are both influenced by reflection light, the detecting unit 13 detects, for example, the pupils PL and PR in the eye regions EL and ER illustrated in FIG. 2, based on information pre-accumulated in the accumulation unit 12. The pupils PL and PR are examples of feature portions of the eyes of the person Q1, and the image processing device 10 may locate the positions of the irises SL and SR, instead of the pupils PL and PR, as feature portions of the eyes of the person Q1 or may detect both the pupils PL and PR and the irises SL and SR as feature portions of the eyes. The image processing device 10 that detects the irises as feature portions of the eyes is described below with reference to FIGS. 16 to 17.

The determining unit 11 and the detecting unit 13 included in the image processing device 10 receive the eye region images from the facial recognition apparatus RCN. An output of the determining unit 11 is connected to the detecting unit 13. The accumulation unit 12 and the detecting unit 13 are coupled to each other, and the detecting unit 13 is capable of referring to the information accumulated in the accumulation unit 12.

For example, with respect to the eye regions EL and ER illustrated in FIG. 2, the determining unit 11 illustrated in FIG. 1 obtains histograms of brightness values of the pixels included in the eye regions EL and ER. Based on the obtained histograms, the determining unit 11 determines whether or not each of the eye regions EL and ER is influenced by reflection light. For example, the determining unit 11 has pre-held, in a built-in memory, a first histogram for a case in which the eye regions EL and ER are influenced by reflection light and a second histogram for a case in which the eye regions EL and ER are not influenced by reflection light. The determining unit 11 compares the obtained histogram for each of the eye regions EL and ER with the held first histogram and second histogram. When the obtained histogram is more similar to the first histogram than to the second histogram, the determining unit 11 determines that the corresponding eye region EL or ER is influenced by reflection light. On the other hand, when the obtained histogram is more similar to the second histogram than to the first histogram, the determining unit 11 determines that the corresponding eye region EL or ER is not influenced by reflection light.

For example, since the degree of similarity between the histogram obtained for the eye region EL illustrated in FIG. 2 and the first histogram is higher than the degree of similarity between the histogram obtained for the eye region EL and the second histogram, the determining unit 11 determines that the eye region EL is influenced by reflection light. Similarly, since the degree of similarity between the histogram obtained for the eye region ER illustrated in FIG. 2 and the first histogram is higher than the degree of similarity between the histogram obtained for the eye region ER and the second histogram, the determining unit 11 determines that the eye region ER is influenced by reflection light.

A scheme for the determining unit 11 to determine whether or not each of the eye regions EL and ER is influenced by reflection light is not limited to the method using the histogram comparison and may be any method for detecting a difference in features in images based on the presence/absence of the influence of reflection light. For example, the determining unit 11 may determine the presence/absence of the influence of reflection light by determining gradients in each of the edges detected from the respective eye regions EL and ER and comparing an average value of the determined gradients with an average value of gradients determined for the edges detected from the eye regions not influenced by reflection light.

The lenses of the eyeglasses GLS illustrated in FIG. 1 are examples of a reflecting member that exists in front of the eyeballs of the person Q1, and the influence of reflection light which is determined by the determining unit 11 is not limited to the influence of reflection light reflected by the lenses of the eyeglasses GLS illustrated in FIG. 1. That is, the reflection light for which the determining unit 11 determines whether or not there is an influence may be, for example, any reflection light reflected by a reflecting member that is situated in front of the eyeballs of the person Q1. Examples of the reflection light include reflection light reflected by a film member attached to the eyeglasses GLS in order to reduce the amount of incidence of blue light. Also, when multiple types of reflecting member exist in front of the eyeballs of the person Q1 and components of reflection light reflected by the respective types of reflecting member are mixed, the determining unit 11 may also determine whether or not there is an influence on the feature values of pixels in the eye regions by performing processing similar to that described above.

The accumulation unit 12 illustrated in FIG. 1 has pre-accumulated features in images of respective feature portions included in the two eyes, for respective strengths of the influences of reflection light that appear in the images of the feature portions. For example, the accumulation unit 12 has pre-accumulated therein, as features in the images of feature portions included in the eye region, pairs of brightness values of pixels inside the pupil and brightness values of pixels included in the iris around the pupil, in association with the respective states in which there are influences of multiple types of reflection light having different strengths.

FIG. 3 illustrates an example of the accumulation unit 12 illustrated in FIG. 1. Rows included in the accumulation unit 12 illustrated in FIG. 3 correspond to states in which there are influences of reflection light having mutually different strengths, and each include an element in a column indicating the brightness value of the pupil and an element in a column indicating the brightness value of the iris.

In the example in FIG. 3, the accumulation unit 12 accumulates, as a feature of the pupils, information indicating a brightness Bp1 of the pupil and a brightness Bs1 of the iris in a state in which there is an influence having a strength corresponding to the strength of the influence of reflection light on the region REA1 illustrated in FIG. 2. Similarly, the accumulation unit 12 illustrated in FIG. 3 accumulates, as a feature of the pupil, information indicating a brightness Bp2 of the pupil and a brightness Bs2 of the iris in a state in which there is an influence having a strength corresponding to the strength of the influence of reflection light on the region REA2 illustrated in FIG. 2. In the example in FIG. 3, features in images of feature portions which are accumulated in association with the strengths of the influences of reflection light that are different from the strengths of the influences of reflection light on the regions REA1 and REA2 are not illustrated. A scheme for accumulating, in the accumulation unit 12, features in images of feature portions in the state in which there is an influence of reflection light having various strengths is described later with reference to FIGS. 6 to 8.

When it is determined that the eye regions are both influenced by reflection light, the detecting unit 13 illustrated in FIG. 1 detects, as feature portions, regions including pixels that are included in the pixels in the respective eye regions and that have a feature that is the same as or similar to those of the feature portions accumulated in the accumulation unit 12.

The detecting unit 13 searches for, in the pupil features accumulated in the accumulation unit 12, for example, a pair of a pupil brightness value similar to the brightness value of a pixel PxL1 included in the eye region EL illustrated in FIG. 2 and an iris brightness value that is the same as or similar to the brightness value of a pixel PxL2 that lies at a distance d from the pixel PxL1. When a pair of a pupil brightness value that is the same as or similar to the brightness value of the pixel PxL1 and an iris brightness value that is the same as or similar to the brightness value of the pixel PxL2 is included in the accumulation unit 12, the detecting unit 13 extracts the pixel PxL1 as a candidate of a pixel included in the pupil PL.

Similarly, the detecting unit 13 searches for, in the pupil features accumulated in the accumulation unit 12, a pair of a pupil brightness value that is the same as or similar to the brightness value of a pixel PxR1 included in the eye region ER and an iris brightness value that is the same as or similar to the brightness value of a pixel PxR2 that lies at the distance d from the pixel PxR1. When a pair of a pupil brightness value that is the same as or similar to the brightness value of the pixel PxR1 and an iris brightness value that is the same as or similar to the brightness value of the pixel PxR2 is included in the accumulation unit 12, the detecting unit 13 extracts the pixel PxR1 as a candidate of a pixel included in the pupil PR.

It is desirable that the distance d between the pixels PxL1 and PxL2 and the distance d between the pixels PxR1 and PxR2 be set to, for example, a value that is larger than the radius of circular patterns included in the image IMG as images of the pupils PL and PR and that is smaller than the diameter of the circular patterns.

Figure 4:
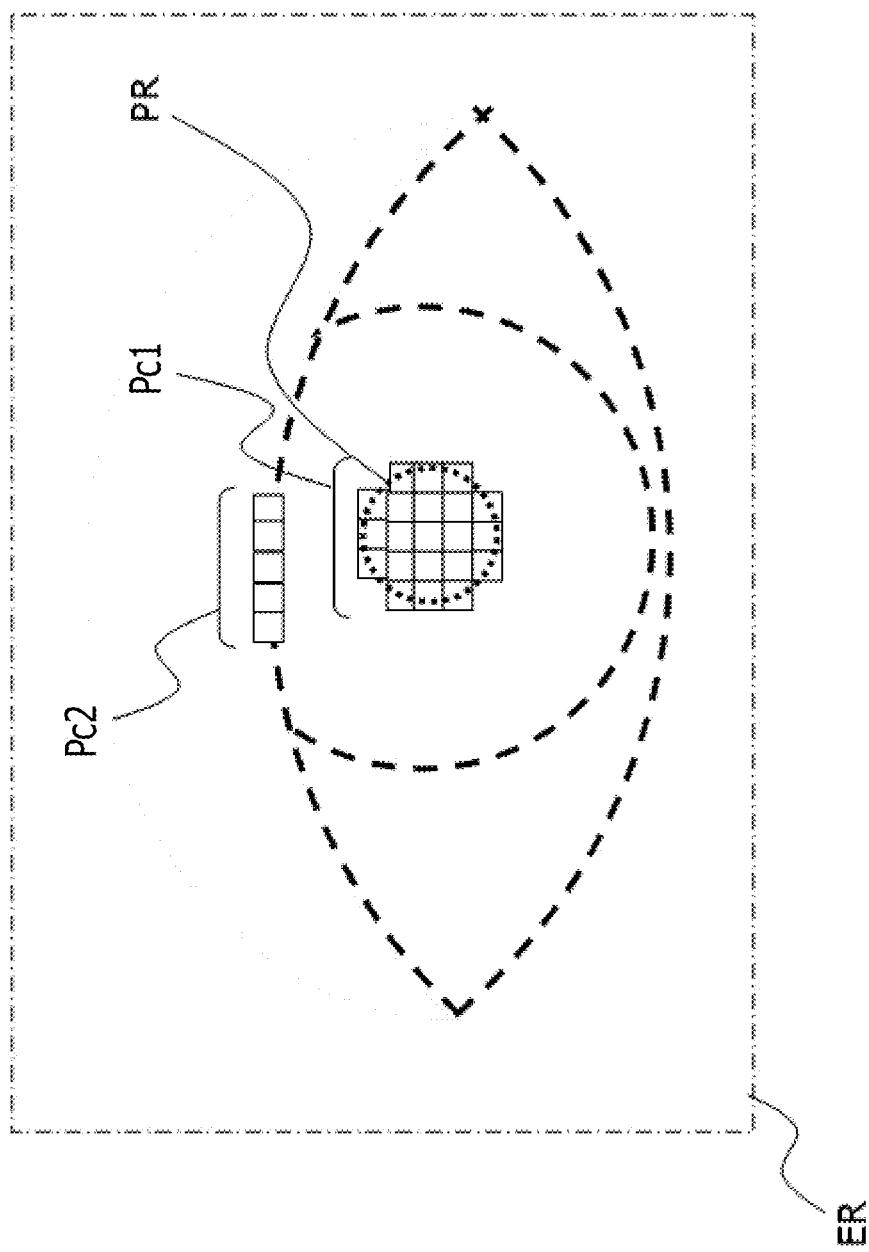
FIG. 4 illustrates an example of candidates of pixels included in the pupil extracted from an eye region illustrated in FIG. 2.

FIG. 4 illustrates an example of candidates of pixels included in the pupil PR extracted from the eye region ER illustrated in FIG. 2. Of the elements illustrated in FIG. 4, elements that are equivalent to those illustrated in FIG. 2 are denoted by the same reference characters, and descriptions thereof may be omitted hereinafter. In FIG. 4, graphics denoted by dashed lines are illustrated in order to indicate positional relationships between the contours of the eyelid and the iris and pixel candidates extracted in processing performed by the detecting unit 13 illustrated in FIG. 1 and are not included in an image indicating candidates of the pixels included in the pupil PR extracted from the eye region ER.

Rectangles denoted by solid lines in FIG. 4 each represent an example of a pixel that the detecting unit 13 extracted from the eye region ER as a candidate of a pixel included in the pupil PR, based on the pupil features accumulated in the accumulation unit 12. Regions Pc1 and Pc2 illustrated in FIG. 4 each represent an example of a region including pixel candidates extracted by the detecting unit 13.

The detecting unit 13 illustrated in FIG. 1 finds, for example, in regions including the extracted pixel candidates (for example, the regions Pc1 and Pc2 illustrated in FIG. 4), a region having a shape that is closer to a circle than other regions, and detects the found region as a region of the pupil PR.

In the example in FIG. 4, the degree of similarity between the contour of the region Pc1 and a circle representing the contour of the pupil PR denoted by the dotted line is, for example, higher than the degree of similarity between the contour of the other region Pc2 and the circle representing the contour of the pupil PR. In this case, the detecting unit 13 detects the region Pc1 as the pupil PR.

Similarly, the detecting unit 13 may detect the pupil PL by finding, in a region including the pixels extracted from the eye region EL illustrated in FIG. 2 as candidates of the pixels included in the pupil PL, a region having a shape closer to a circle than other regions.

Figure 5:
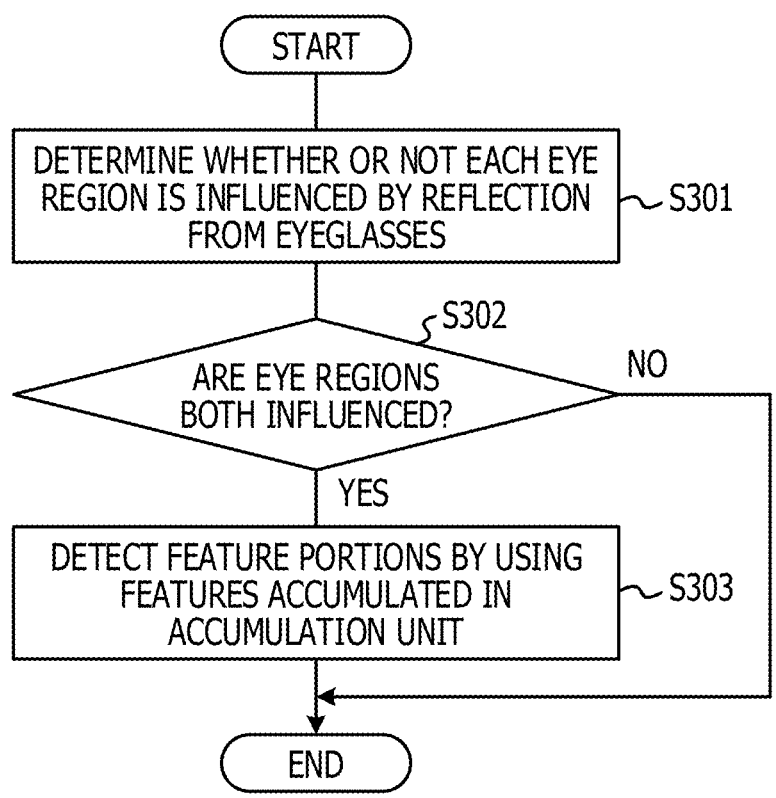
FIG. 5 illustrates the operation of the image processing device illustrated in FIG. 1.

FIG. 5 illustrates the operation of the image processing device 10 illustrated in FIG. 1. Processes in steps S301 to S303 illustrated in FIG. 5 correspond to the operation of the image processing device 10 illustrated in FIG. 1 and are example processes realized by an image processing method and an image processing program for detecting feature portions of the eyes of the person Q1 when both of the eye regions are influenced by reflection light. For example, a processor included in the image processing device 10 executes the image processing program to thereby realize the processes illustrated in FIG. 5. Hardware included in the image processing device 10 may execute the processes illustrated in FIG. 5. The processes in steps S301 to S303 illustrated in FIG. 5 may be executed, for example, each time the image processing device 10 illustrated in FIG. 1 receives images of the eye regions ER and EL illustrated in FIG. 2 from the facial recognition apparatus RCN. That is, the processes in steps S301 to S303 illustrated in FIG. 5 may be executed each time the photographic device CAM photographs the person Q1.

In step S301, the determining unit 11 illustrated in FIG. 1 determines whether or not each of the eye regions ER and EL received from the facial recognition apparatus RCN is influenced by reflection light reflected by a reflecting member other than the surfaces of the eyeballs, as described above with reference to FIG. 2.

In step S302, the processor included in the image processing device 10 determines whether or not it was determined in the process in step S301 that the eye regions ER and EL are both influenced by reflection light.

When the processor determines that the eye regions EL and ER are both influenced by reflection light reflected by a reflecting member, such as the lenses of the eyeglasses GLS (affirmative determination (YES) in step S302), as in the example in FIG. 2, the process proceeds to step S303.

In step S303, the detecting unit 13 extracts, from the respective eye regions EL and ER, pixels having a feature that is the same as or similar to the feature-portion features accumulated in the accumulation unit 12 and detects, as feature portions, respective regions including the extracted pixels, in the manner described above with reference to FIGS. 2 and 4.

If it is determined that the eye regions ER and EL are both influenced by reflection light, information indicating the positions of the feature portions detected in the process in step S303, instead of the detection result of the feature detecting device CDT, is passed to the line-of-sight detecting device DET. That is, if it is determined that the eye regions ER and EL are both influenced by reflection light, the line-of-sight detecting device DET determines the line-of-sight direction of the person Q1, based on the feature-portion positions passed from the image processing device 10.

On the other hand, if it is determined that at least one of the eye regions EL and ER is not influenced by reflection light reflected by a reflecting member, such as the lenses of the eyeglasses GLS (negative determination (NO) in step S302), the image processing device 10 ends the processing without locating the positions of feature portions.

In this case, the line-of-sight detecting device DET determines the line-of-sight direction of the person Q1, by using the positions of the feature portions that the feature detecting device CDT detected from the respective eye regions EL and ER.

As described above, when the eye regions are both influenced by reflection light, the image processing device 10 illustrated in FIG. 1 extracts pixel candidates representing the pupils in the eye regions, based on the feature information accumulated in the accumulation unit 12, to thereby locate the positions of the pupils of the left and right eyes.

That is, the image processing device 10 illustrated in FIG. 1 is capable of locating the positions of the left and right pupils PL and PR as eye feature portions used for detecting the line-of-sight of the person Q1, even when there is reflection due to a reflecting member situated in front of the eyeballs.

The eye feature portions detected by the image processing device 10 are not limited to the pupils PL and PR illustrated in FIG. 2 and so on and may also be the left and right irises SL and SR illustrated in FIG. 2 or both the pupils PL and PR and the irises SL and SR. The image processing device 10 that detects the irises SL and SR as feature portions are described later with reference to FIGS. 16 and 17.

Now, a description will be given of a scheme for accumulating features in images of feature portions in the accumulation unit 12 based on the image IMG captured by the photographic device CAM illustrated in FIG. 1.

Figure 6:
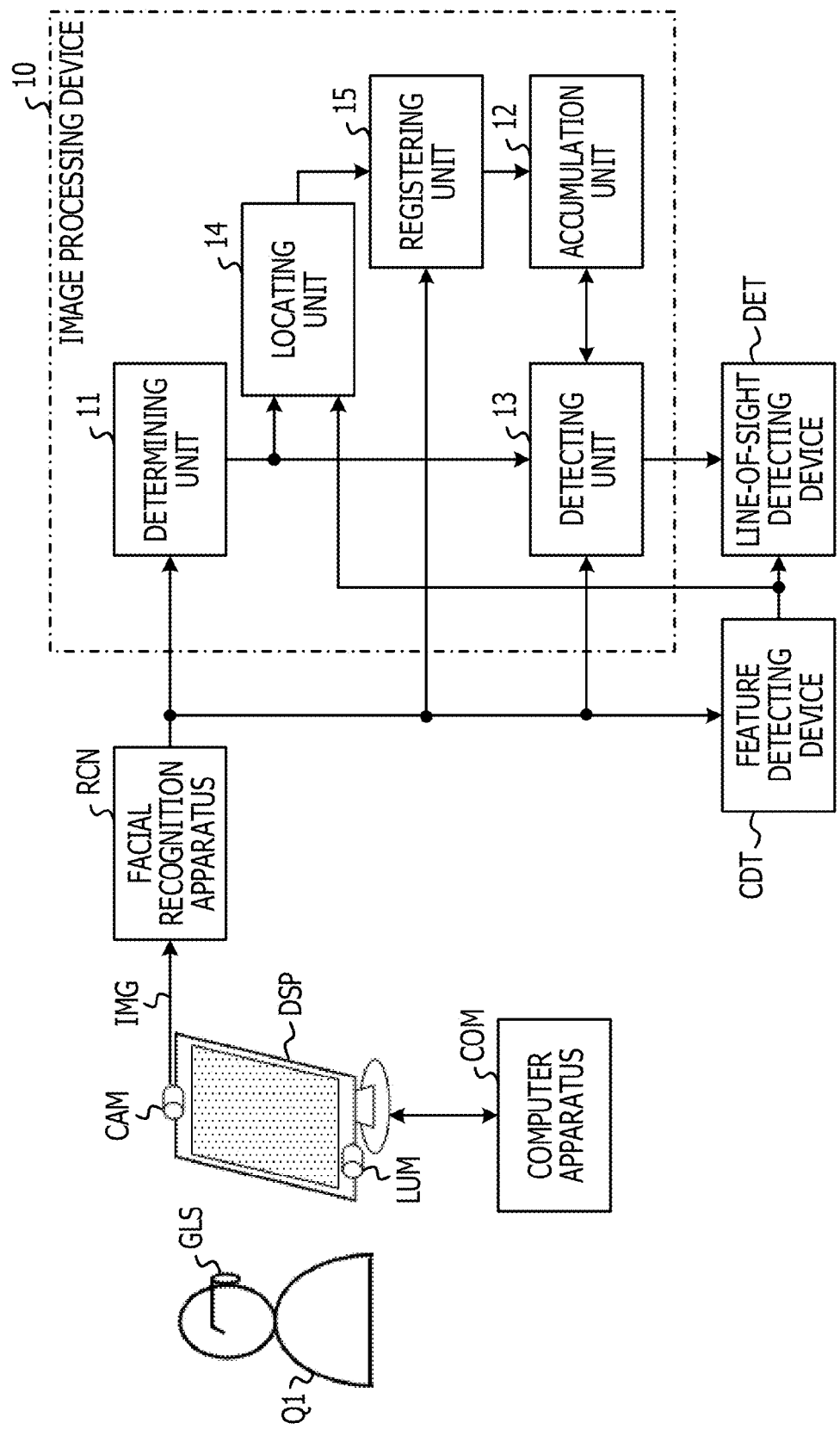
FIG. 6 illustrates another embodiment of the image processing device.

FIG. 6 illustrates another embodiment of the image processing device 10. Of the constituent elements illustrated in FIG. 6, constituent elements that are equivalent to those illustrated in FIG. 1 are denoted by the same reference numerals, and descriptions thereof may be omitted hereinafter.

The image processing device 10 illustrated in FIG. 6 includes a locating unit 14 and a registering unit 15, in addition to the determining unit 11, the accumulation unit 12, and the detecting unit 13 illustrated in FIG. 1. The locating unit 14 receives an output of the determining unit 11 and an output of the feature detecting device CDT. The registering unit 15 receives eye regions extracted by the facial recognition apparatus RCN and also receives an output of the locating unit 14. An output of the registering unit 15 is passed to the accumulation unit 12.

In this case, for example, when the photographic device CAM repeatedly photographs the person Q1 at certain time intervals, there is a possibility that resulting images IMG include an image IMG in which only one of the eye regions EL and ER corresponding to both eyes is influenced by reflection light.

Figure 7:
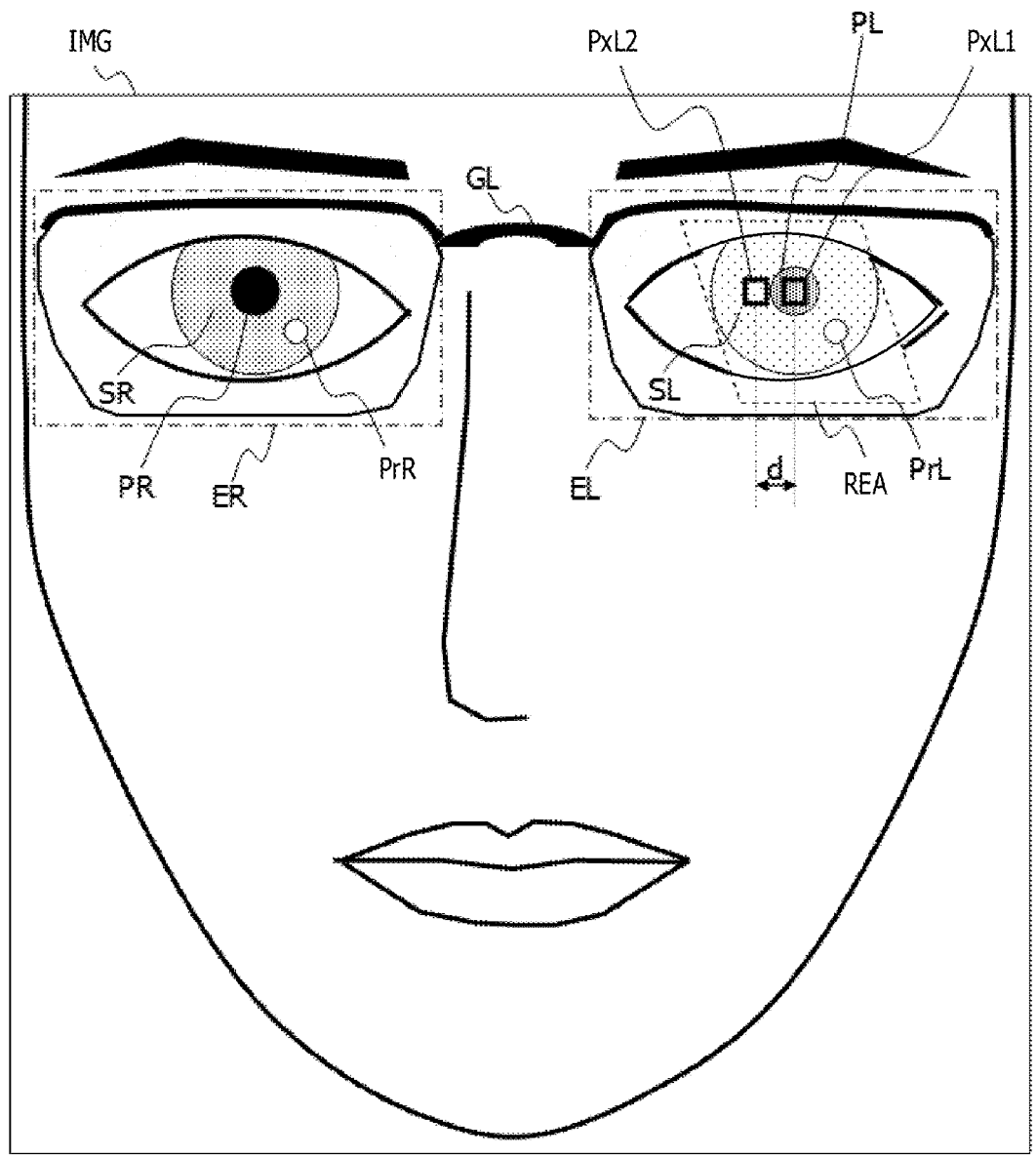
FIG. 7 illustrates an example of an image in which only one of the eye regions is influenced by reflection light.

FIG. 7 illustrates an example of the image IMG in which only one of the eye regions EL and ER is influenced by reflection light. Of the elements illustrated in FIG. 7, elements that are equivalent to those illustrated in FIG. 2 or 4 are denoted by the same reference characters, and descriptions thereof may be omitted hereinafter.

FIG. 7 illustrates an example in which the eye region EL corresponding to the left eye of the person Q1 is influenced by reflection light reflected by the lenses of the eyeglasses GLS or the like and the eye region ER corresponding to the right eye of the person Q1 is not influenced by reflection light reflected by the lenses of the eyeglasses GLS or the like. That is, FIG. 7 illustrates an example in which one of the two eye regions EL and ER corresponding to both eyes of the person Q1 is influenced by reflection light reflected by a reflecting member situated in front of the eyeballs.

In FIG. 7, a parallelogram REA denoted by a dashed line represents, in the eye region EL, an example of a region in which the brightness values are influenced by reflection light reflected by the left lens of the eyeglasses GLS. The dashed line denoting the region REA influenced by the reflection light is depicted in FIG. 7 for the sake of explanation and is not included in the image IMG.

The relative position of the pupil PR to a Purkinje image PrR included in one eye region ER and the relative position of the pupil PL to a Purkinje image PrL included in the other eye region EL have a correlationship in the image IMG resulting from photographing a region including the face of the person Q1. The Purkinje images PrR and PrL both have circular patterns having high brightness, compared with other images included in the eye regions ER and EL. Thus, even when the Purkinje image PrL is included in the region REA, as illustrated in FIG. 7, the feature detecting device CDT may detect the position of the Purkinje image PrL, for example, by detecting a portion in which pixels whose brightness values are larger than or equal to a predetermined value are distributed in a circular pattern. The feature detecting device CDT then passes, to the locating unit 14, information indicating the position of the pupil PR detected as a feature portion from the eye region ER illustrated in FIG. 7 and information indicating the positions of the Purkinje images PrR and PrL detected from the respective eye regions ER and EL.

The locating unit 14 illustrated in FIG. 6 then locates the position of the pupil in the eye region influenced by reflection light, based on the relative position of the pupil to the Purkinje image detected from the eye region not influenced by reflection light and the position of the Purkinje image detected from the eye region influenced by reflection light.

For example, the locating unit 14 determines the relative position of the pupil PR to the Purkinje image PrR, based on the positions of the pupil PR and the Purkinje image PrR that the feature detecting device CDT detected from the eye region ER illustrated in FIG. 7. The locating unit 14 then passes, to the registering unit 15 as the position of the pupil PL, the position indicated by the relative position determined with respect to the position of the Purkinje image PrL that the feature detecting device CDT detected from the eye region EL.

The locating unit 14 may also pass, to the line-of-sight detecting device DET, the feature portion (for example, the pupil PL) position located for the eye region (for example, the eye region EL illustrated in FIG. 7) influenced by reflection light. The locating unit 14 may also locate the position of the pupil PL, for example, by detecting a pattern having a contour that is the same as or similar to the contour of the pupil PR detected from the eye region ER from a predetermined region including a position in the eye region EL indicated by the relative position of the pupil PR to the Purkinje image PrR. The locating unit 14 that uses pattern matching processing to locate the position of the pupil included in the eye region influenced by reflection light is described later with reference to FIGS. 7 and 8.

The registering unit 15 illustrated in FIG. 6 receives an eye region (for example, the eye region EL illustrated in FIG. 7) determined to be influenced by reflection light. The registering unit 15 then extracts, from the received eye region, a feature in the image in the region indicated by the feature-portion position located by the locating unit 14, and causes the accumulation unit 12 to store the extracted feature therein.

The registering unit 15 registers, in the accumulation unit 12 as a feature of the pupil, for example, a pair of the brightness value of the pixel PxL1 at the pupil PL position located by the locating unit 14 and the brightness value of the pixel PxL2 at the position at a predetermined distance d from the pixel PxL1, the pixels PxL1 and PxL2 being included in the eye region EL illustrated in FIG. 7. In this case, the pixel PxL1 at the position located by the locating unit 14 and the other pixel PxL2 at the position at the predetermined distance d from the pixel PxL1 are examples of a region indicated by a located feature-portion position.

It is desirable that the distance d between the pixel PxL1 and the pixel PxL2 illustrated in FIG. 7 be set to, for example, a value that is larger than the radius of a circle representing the pupil PR detected from the eye region ER not influenced by reflection light and that is smaller than the diameter of the circle representing the pupil PR. In this case, the pair of the brightness value of the pixel PxL1 and the brightness value of the pixel PxL2 indicates the brightness of the pupil PL in a state in which the eye region EL is influenced by reflection light and the brightness of the iris SL in a state in which the eye region EL is influenced by the same reflection light. That is, the pair of two brightness values that the registering unit 15 registers in the accumulation unit 12 indicates a feature indicated by the image of the pupil and the iris when the images of the eye regions corresponding to both eyes of the person Q1 are influenced by reflection light reflected by a reflecting member, such as the eyeglasses GLS. The rectangles representing the pixel PxL1 and the pixel PxL2 are graphics depicted in FIG. 2 for the sake of explanation and are not included in the image IMG.

Figure 8:
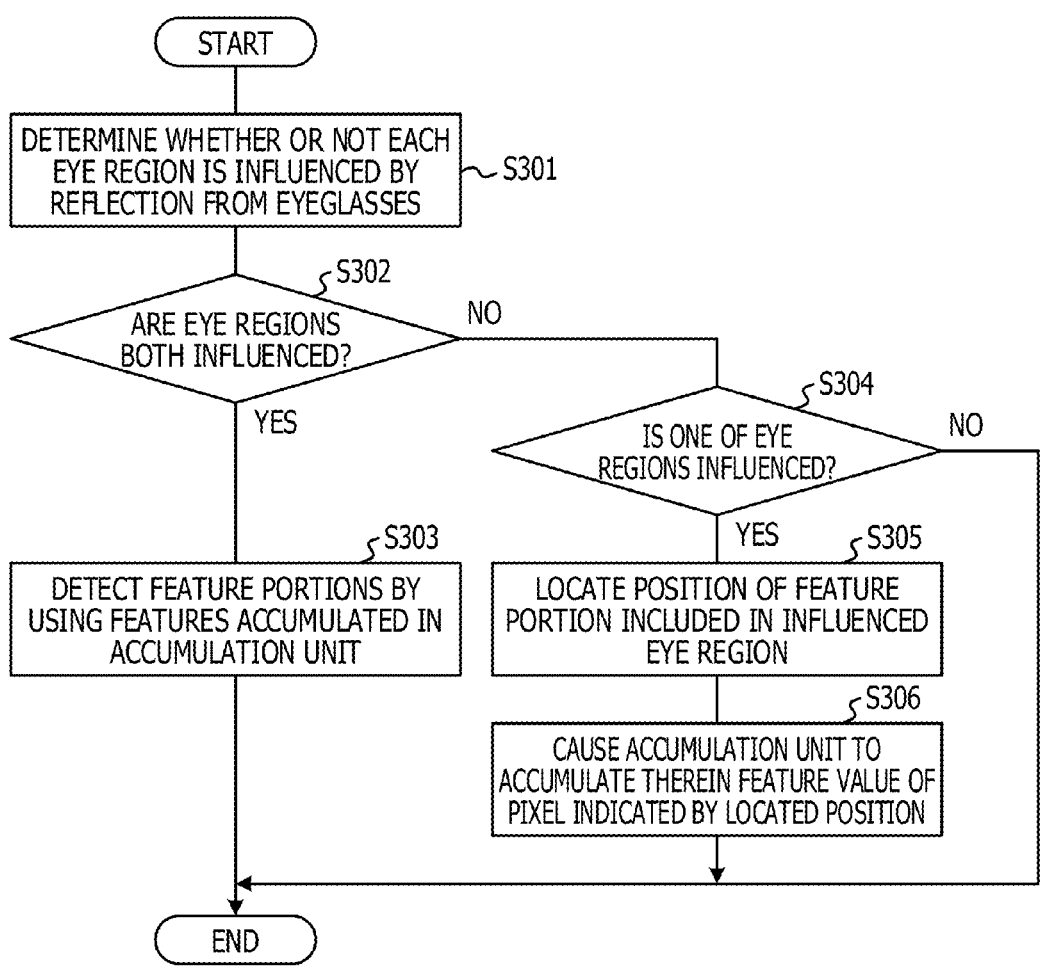
FIG. 8 illustrates the operation of the image processing device illustrated in FIG. 6.

FIG. 8 illustrates the operation of the image processing device 10 illustrated in FIG. 6. Of steps illustrated in FIG. 8, steps that are equivalent to those illustrated in FIG. 5 are denoted by the same reference numerals, and descriptions thereof may be omitted hereinafter. For example, the processor included in the image processing device 10 executes the image processing program to thereby execute processes in steps S301 to S306 illustrated in FIG. 8. Hardware included in the image processing device 10 may execute the processes illustrated in FIG. 8.

Through a negative determination (NO) route in step S302 illustrated in FIG. 8, the image processing device 10 illustrated in FIG. 6 executes processes in steps S304, S305, and S306 described below.

In step S304, the processor illustrated in the image processing device 10 determines whether or not only one of the two eye regions EL and ER is influenced by reflection light reflected by a reflecting member, such as the eyeglasses GLS.

If it is determined that only the eye region EL is influenced by reflection light reflected by a reflecting member, such as the eyeglasses GLS (affirmative determination (YES) in step S304), as in the example illustrated in FIG. 7, the process proceeds to step S305.

On the other hand, if it is determined that neither of the eye regions EL and ER is influenced by reflection light reflected by a reflecting member, such as the eyeglasses GLS (negative determination (NO) in step S304), the image processing device 10 illustrated in FIG. 6 ends the processing without locating the positions of feature portion.

In step S305, the locating unit 14 illustrated in FIG. 6 locates the position of, for example, the pupil PL as the position of a feature portion included in the eye region (for example, the eye region EL) determined to be influenced by reflection light, as described above with reference to FIG. 7.

In step S306, the registering unit 15 illustrated in FIG. 6 causes the accumulation unit 12 to accumulate therein, as a feature in the image of the feature portion influenced by reflection light, the feature value of a pixel included in the eye region determined to be influenced by reflection light and indicated by the position located in the process in step S305.

As described above, each time it is determined that only one of the eye regions EL and ER is influenced by reflection light, the image processing device 10 illustrated in FIG. 6 executes the processes in steps S305 and S306 to thereby cause the accumulation unit 12 to thereby accumulate therein a feature in an image of a feature portion influenced by the reflection light.

When the strength of reflection light received by the eye regions ER and EL changes to various levels during a process in which the photographic device CAM illustrated in FIG. 6 captures a large number of images IMG, the registering unit 15 causes the accumulation unit 12 to accumulate therein features in images of the pupil influenced by the reflection light having the various strengths. In other words, according to the image processing device 10 illustrated in FIG. 6, features in images of a feature portion influenced by reflection light may be accumulated in the accumulation unit 12 for respective strengths of the influences of the reflection light, based on the images IMG time-sequentially captured by the photographic device CAM. That is, the image processing device 10 illustrated in FIG. 6 may generate information used for detecting feature portions when the eye regions are both influenced by reflection light, in parallel with the process in which the line-of-sight detecting device DET detects the line-of-sight direction of the person Q1, and may cause the accumulation unit 12 to accumulate the generated information therein.

The pixels whose brightness values are accumulated in the column "brightness value of iris" in the accumulation unit 12 in FIG. 3 by the registering unit 15 are not limited to pixels indicated by the positional relationships illustrated in FIGS. 2 and 7, and may also be any pixels that lie on the circumference of a circle having its center at the position located by the locating unit 14 and having a radius d. The registering unit 15 may also cause the accumulation unit 12 to accumulate therein a pair of the brightness value of each of a plurality of pixels inside the circle having its center at the located position and having a radius that is substantially equal to that of the pupil detected from the eye region not influenced by reflection light and the brightness value of a pixel that opposes that pixel with the contour interposed therebetween. Another example of the pair of pixels whose brightness values are to be accumulated in the registering unit 15 by the accumulation unit 12 as a feature in an image of the pupil influenced by reflection light is described below with reference to FIG. 11.

As described above, when one of the eye regions is influenced by reflection light reflected by the lenses of the eyeglasses GLS or the like, the image processing device 10 illustrated in FIG. 6 accumulates, in the accumulation unit 12, features in images of the pupil influenced by the reflection light. When the eye regions are both influenced by reflection light, the detecting unit 13 detects the pupils of the left and right eyes, by extracting candidates of pixels representing the pupils from the pixels included in the eye regions, based on the features accumulated in the accumulation unit 12.

That is, the image processing device 10 illustrated in FIG. 6 is capable of locating the positions of the pupils PL and PR in the respective eye regions EL and ER, even when the influence of reflection light reflected by the lenses of the eyeglasses GLS worn by the person Q1 or the like makes it difficult for the feature detecting device CDT to detect feature portions.

The eye feature portions of the person Q1 that are detected by the image processing device 10 are not limited to the pupils PL and PR illustrated in FIG. 2 or 7, and may also be the left and right irises SL and SR illustrated in FIG. 2 or 7 or both the pupils PL and PR and the irises SL and SR. The image processing device 10 that detects the irises SL and SR as feature portions are described later with reference to FIGS. 16 and 17.

Figure 9:
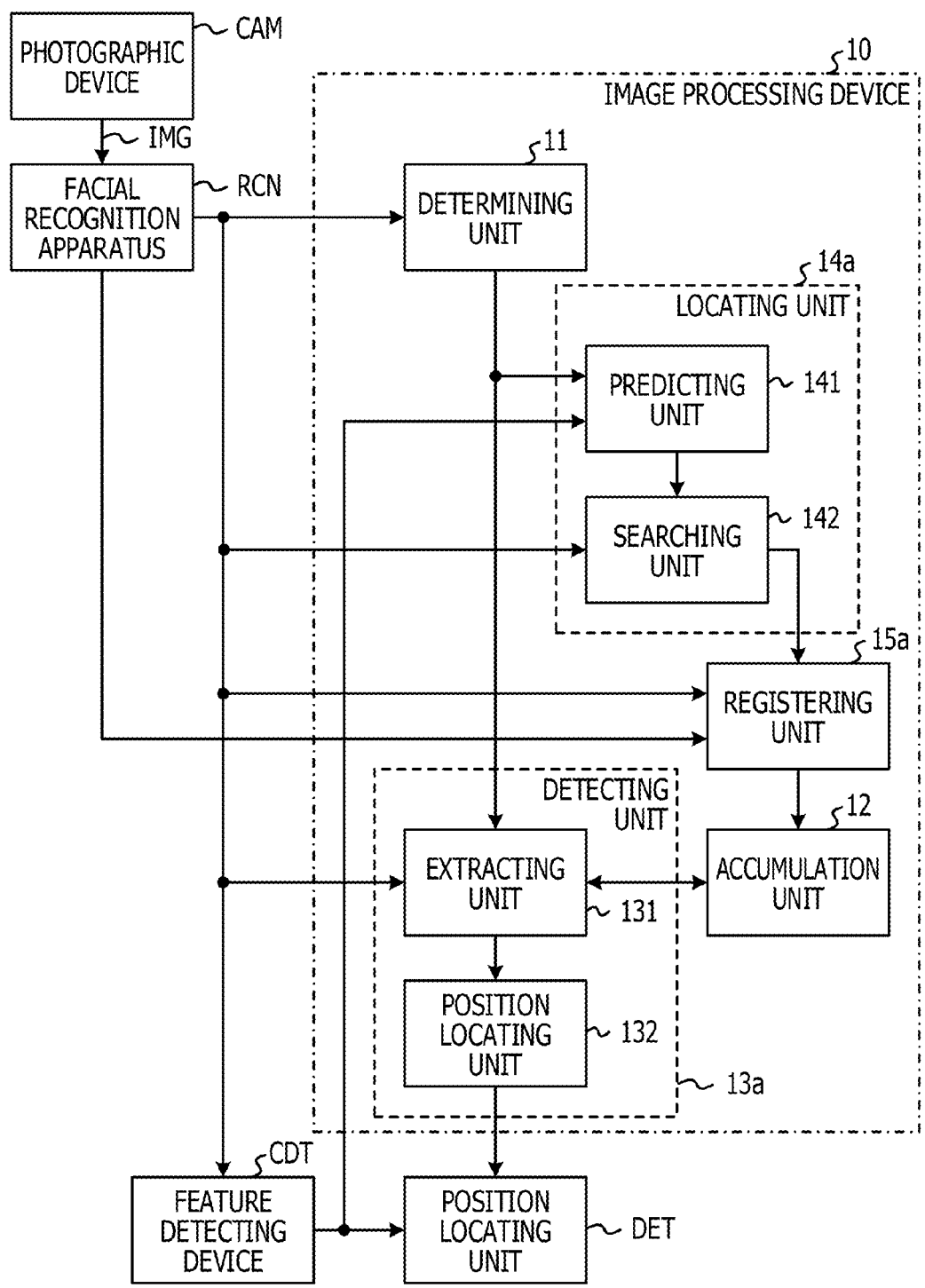
FIG. 9 illustrates another embodiment of the image processing device.

FIG. 9 illustrates another embodiment of the image processing device 10. Of the constituent elements illustrated in FIG. 9, constituent elements that are equivalent to those illustrated in FIG. 6 are denoted by the same reference numerals, and descriptions thereof may be omitted hereinafter.

A detecting unit 13a illustrated in FIG. 9 includes an extracting unit 131 and a position locating unit 132. When the determining unit 11 determines that one of the eye regions EL and ER is influenced by reflection light reflected by a reflecting member, such as the eyeglasses GLS, the extracting unit 131 receives the image of the eye region EL or ER determined to be influenced by the reflection light. The extracting unit 131 and the accumulation unit 12 are coupled to each other, and the extracting unit 131 is capable of referring to information accumulated in the accumulation unit 12. An output of the extracting unit 131 is passed to the position locating unit 132 and is used for processing, performed by the position locating unit 132, for locating the positions of feature portions. An output of the position locating unit 132 is passed to the line-of-sight detecting device DET. Functions and operations of the extracting unit 131 and the position locating unit 132 included in the detecting unit 13a are described later with reference to FIGS. 11 and 12.

A locating unit 14a illustrated in FIG. 9 includes a predicting unit 141 and a searching unit 142. When it is determined that one of the eye regions EL and ER is influenced by reflection light reflected by a reflecting member, such as the eyeglasses GLS, the predicting unit 141 receives information indicating the positions of a feature portion and a Purkinje image that the feature detecting device CDT detected from the eye region determined not to be influenced by reflection light. When it is determined that one of the eye regions EL and ER is influenced by reflection light reflected by a reflecting member, such as the eyeglasses GLS, the predicting unit 141 receives information indicating the position of a Purkinje image that the feature detecting device CDT detected from the eye region determined to be influenced by the reflection light. An output of the predicting unit 141 is passed to the searching unit 142 and is used to set a range for searching for feature portions in the search processing performed by the searching unit 142. The information indicating the position of the feature portion resulting from the searching performed by the searching unit 142 is passed to the registering unit 15 and is used to identify pixels whose brightness values are to be accumulated in the accumulation unit 12 as a feature in an image of the feature portion.

Before the extracting unit 131 and the position locating unit 132 included in the detecting unit 13a are described, a description will be given of the functions and operations of the predicting unit 141 and the searching unit 142 included in the locating unit 14a.

Similarly to the locating unit 14 illustrated in FIG. 6, the predicting unit 141 predicts the position of the pupil included in the eye region influenced by reflection light, based on the relative position of the pupil to the Purkinje image in the eye region determined not to be influenced by reflection light and the position of the Purkinje image of the eye region influenced by the reflection light.

There are cases in which a region detected as a Purkinje image from an eye region influenced by reflection light is low in roundness, compared with a Purkinje image detected from an eye region not influenced by reflection light.

Figure 10:
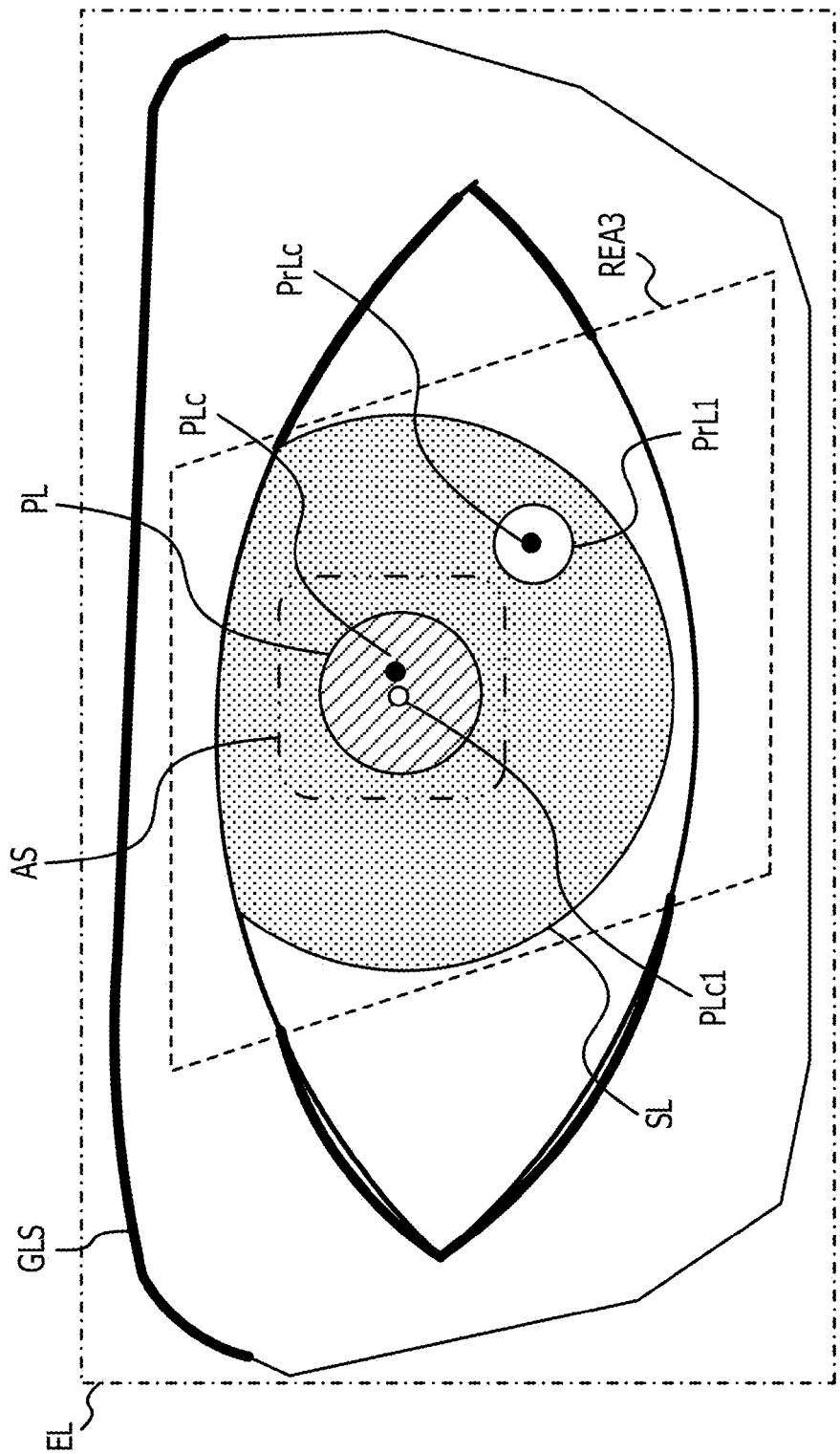
FIG. 10 illustrates another example of the eye region illustrated in FIG. 2.

FIG. 10 illustrates another example of the eye region EL illustrated in FIG. 2. Of the elements illustrated in FIG. 10, elements that are equivalent to those illustrated in FIG. 2 are denoted by the same reference characters, and descriptions thereof may be omitted hereinafter. In FIG. 10, a parallelogram region REA3 denoted by a dashed line represents, in the eye region EL, a region where the brightness values are influenced by components of reflection light reflected by a reflecting member, such as the eyeglasses GLS. The dashed line denoting the region REA3 in FIG. 10 is depicted for the sake of explanation and is not included in an image of the eye region EL.

An elliptical region PrL1 illustrated in FIG. 10 represents a region that the feature detecting device CDT illustrated in FIG. 9 extracted as a Purkinje image from the eye region EL including the region REA3 influenced by reflection light, and a point PrLc represents the Purkinje-image center position determined from the shape of the region PrL1.

When the influence of reflection light and a Purkinje image overlap each other, as illustrated in FIG. 10, there are cases in which a region having a shape different from a circle, like that of the region PrL1, is detected as a region including pixels having a brightness higher than or equal to a threshold that the feature detecting device CDT uses to detect a Purkinje image.

In this case, there is a possibility that the center position PrLc determined from the shape of the region PrL1 is displaced from the position of an original Purkinje image for the corresponding left eyeball of the person Q1 photographed by the photographic device CAM. There is also a possibility that a left-pupil center position PLc of the person Q1 which is predicted based on the position of the point PrLc does not match the center of the original pupil PL included in the eye region EL.

Accordingly, the searching unit 142 illustrated in FIG. 9 detects the pupil PL by searching for, in a predetermined range AS including the left-pupil center position PLc predicted by the predicting unit 141, a pattern having a shape that is equivalent to that of the pupil detected from the eye region determined not to be influenced by reflection light. The searching unit 142 also determines, as the center position of the pupil PL, the position of a point PLc1 denoted by a white circle in FIG. 10, based on the outer shape of the detected pupil PL. The searching unit 142 then passes, as the position of a feature portion included in a first eye region (for example, the eye region EL in FIG. 7), information indicating the position of the determined center PLc1 of the pupil PL to the accumulation unit 12 illustrated in FIG. 9 and the line-of-sight detecting device DET.

The black circles representing the points PrLc and PLc and the white circle representing the point PLc1, which points are illustrated in FIG. 10, are depicted for the sake of explanation and are not included in an image of the eye region EL. Similarly, in FIG. 10, a chain double-dashed line denoting the range AS for searching performed by the searching unit 142 is depicted for the sake of explanation and is not included in an image of the eye region EL.

As described above, the locating unit 14a illustrated in FIG. 9 utilizes the fact that the shapes of the left and right pupils are similar to each other, to detect the position of the pupil included in the eye region influenced by reflection light. Thus, for example, when a Purkinje image is deformed by the influence of reflection light, the position of the pupil included in the eye region influenced by the reflection light may be detected with high accuracy, compared with a case in which the position of the deformed Purkinje image is directly used.

Next, a description will be given of another example of features in images of a feature portion that are accumulated in the accumulation unit 12 by a registering unit 15a.

The registering unit 15a causes the accumulation unit 12 to accumulate therein, as features in images of the pupil influenced by reflection light having mutually different strengths, the brightness values of pixels having a predetermined positional relationship with the contour of the pupil indicated by the center position of the pupil (for example, the pupil PL in FIG. 7) located in the searching performed by the searching unit 142. The registering unit 15a receives, for example, from the facial recognition apparatus RCN, information indicating the contour of the upper eyelid and the contour of the lower eyelid of the person Q1, and uses the received information when causing the accumulation unit 12 to accumulate therein a feature in an image of the pupil influenced by reflection light.

Figure 11:
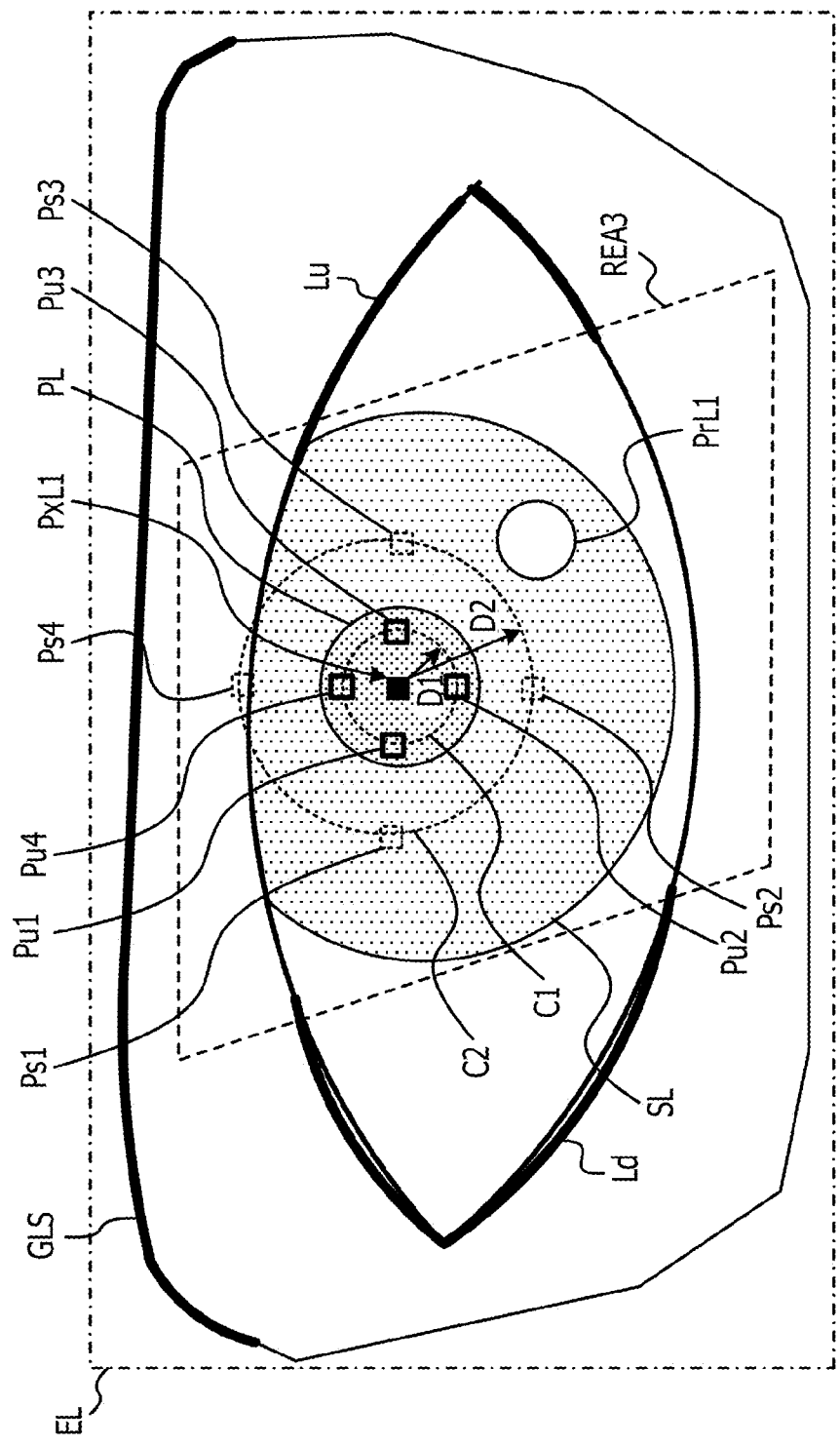
FIG. 11 illustrates another example of features accumulated in an accumulation unit by a registering unit.

FIG. 11 illustrates another example of the features accumulated in the accumulation unit 12 by the registering unit 15. Of the elements illustrated in FIG. 11, elements that are equivalent to those illustrated in FIG. 2 or 10 are denoted by the same reference characters, and descriptions thereof may be omitted hereinafter.

A black rectangle PxL1 illustrated in FIG. 11 represents a pixel that lies at the pupil center position located in the searching performed by the searching unit 142. Rectangles Pu1, Pu2, Pu3, and Pu4 denoted by solid lines in FIG. 11 each represent an example of a pixel that lies on the circumference of a circle C1 having its center at the pixel PxL1 and having a predetermined radius D1. Rectangles Ps1, Ps2, Ps3, and Ps4 denoted by dashed lines in FIG. 11 each represent an example of a pixel that lies on the circumference of a circle C2 having its center at the pixel PxL1 and having a predetermined radius D2. In this case, the radius D1 of the circle C1 illustrated in FIG. 11 is set to, for example, a value that is smaller than a radius of the pupil (for example, the pupil PR) detected from the eye region (for example, the eye region ER illustrated in FIG. 7) determined not to be influenced by reflection light. The radius D2 of the circle C2 illustrated in FIG. 11 is set to, for example, a value that is larger than the radius of the pupil detected from the eye region determined not to be influenced by reflection light and that is smaller than a radius of the iris detected from the eye region determined not to be influenced by reflection light.

A curve line Lu illustrated in FIG. 11 represents the contour of the upper eyelid of the person Q1 which is indicated by a result of the facial recognition performed by the facial recognition apparatus RCN, and a curve line Ld represents the contour of the lower eyelid of the person Q1 which is also indicated by the result.

The registering unit 15a illustrated in FIG. 9 locates the pixels Pu1, Pu2, Pu3, and Pu4 on the circle C1 illustrated in FIG. 11 and the pixels Ps1, Ps2, Ps3, and Ps4 on the circle C2, based on the pupil center position indicated by the information received from the searching unit 142. In this case, it is desirable that the registering unit 15a set the pixels Ps1, Ps2, Ps3, and Ps4 on the circumference of the circle C2 to positions that oppose the corresponding pixels Pu1, Pu2, Pu3, and Pu4 on the circumference of the circle C1, with the contour of a circle having an intermediate size of the circle C1 and the circle C2 being interposed therebetween. In such a case, the pixel Pu1 and the pixel Ps1 are located inside the pupil PL and inside the iris SL surrounding the pupil PL, respectively, with the contour of the pupil PL being interposed between pixel Pu1 and the pixel Ps1. Similarly, the pixel Pu2 and the pixel Ps2 are located inside the pupil PL and inside the iris SL, respectively, with the contour of the pupil PL being interposed between the pixel Pu2 and the pixel Ps2; the pixel Pu3 and the pixel Ps3 are located inside the pupil PL and inside the iris SL, respectively, with the contour of the pupil PL being interposed between the pixel Pu3 and the pixel Ps3; and the pixel Pu4 and the pixel Ps4 are located inside the pupil PL and inside the iris SL, respectively, with the contour of the pupil PL being interposed between the pixel Pu4 and the pixel Ps4.

The registering unit 15a registers, in the accumulation unit 12, each of a pair of the brightness value of the pixel Pu1 and the brightness value of the pixel Ps1 and a pair of the brightness value of the pixel Put and the brightness value of the pixel Ps2 as a feature in the image of the pupil influenced by reflection light. Similarly, the registering unit 15a registers, in the accumulation unit 12, a pair of the brightness value of the pixel Pu3 and the brightness value of the pixel Ps3 and a pair of the brightness value of the pixel Pu4 and the brightness value of the pixel Ps4 as a feature in the image of the pupil influenced by reflection light.

In the example in FIG. 11, since the pixel Ps4 lies in the upper eyelid above the contour Lu of the upper eyelid, the brightness value of the pixel Ps4 indicates the brightness of the upper eyelid, not the brightness of the iris SL. Thus, when a pixel extracted based on the circle C1 or the circle C2 is included in a region representing the upper eyelid or the lower eyelid, it is desirable that the registering unit 15a does not register, in the accumulation unit 12, a pair of brightness values including the brightness value of the pixel included in the region indicating the upper eyelid or the lower eyelid.

The pixels Pu1 to Pu4 illustrated in FIG. 11 each represent an example of pixels that lie inside a feature portion (for example, the pupil PL) included in an eye region determined to be influenced by reflection light. The pixels Ps1 to Ps4 illustrated in FIG. 11 each represent an example of pixels that lie around a feature portion in an eye region determined to be influenced by reflection light.

Also, the number of pixels on the circumference of the circle C1, the brightness values of the pixels being accumulated in the accumulation unit 12 by the registering unit 15a, is not limited to four illustrated in FIG. 11 and may be any number that is one or more. For instance, the registering unit 15a may register, in the accumulation unit 12, for example, features including the brightness values of four pixels that lie at middles between the pixels Pu1, Pu2, Pu3, and Pu4, that is, a pixel that lies at a middle between the pixels Pu1 and Pu2, a pixel that lies at a middle between the pixels Pu2 and Pu3, a pixel that lies at a middle between the pixels Pu3 and Pu4, and a pixel that lies at a middle between the pixels Pu4 and Pu1, in conjunction with features including the brightness values of the respective pixels Pu1, Pu2, Pu3, and Pu4 illustrated in FIG. 11.

As described above, the registering unit 15a illustrated in FIG. 9 causes the accumulation unit 12 to accumulate therein, as features of an image of the pupil influenced by reflection light, the brightness values of a plurality of pairs of pixels that oppose each other with the contour of the pupil, indicated by the pupil center position located by the locating unit 14a, being interposed therebetween. Thus, for example, when a plurality of regions in which the strengths of the influences of reflection light are different from each other coexist in the region REA3 illustrated in FIG. 11, features in the vicinity of the boundary between the pupil and the iris influenced by the reflection light having the strengths in the respective regions may be accumulated in the accumulation unit 12 at once.

Next, the functions and operations of the extracting unit 131 and the position locating unit 132 included in the detecting unit 13a illustrated in FIG. 9 will be described with reference to FIGS. 11 and 12.

The extracting unit 131 sequentially pays attention to each of the pixels in the eye region determined to be influenced by reflection light and uses the information accumulated in the accumulation unit 12 to extract candidates of pixels representing the contour of a feature portion in the following manner. For example, when a pair of the brightness value of a first pixel paid attention to and the brightness value of a second pixel that lies at a predetermined distance from the first pixel is accumulated in the accumulation unit 12, the extracting unit 131 extracts the first pixel and the second pixel as candidates of pixels representing the contour of the pupil. In this case, it is desirable that the extracting unit 131 set the distance between the first pixel and the second pixel to be equivalent to the difference between the radius D1 of the circle C1 and the radius D2 of the circle C2 illustrated in FIG. 11. In this case, the second pixel is one of a plurality of pixels that lie on the circumference of a circle having its center at the first pixel and having a predetermined radius indicated by the difference between the radii D1 and D2.

For example, when the brightness value of a first pixel is included in the features, accumulated in the accumulation unit 12, as a brightness value inside the pupil, the extracting unit 131 compares the brightness value of each of the pixels that lie on the circumference of a circle having its center at the first pixel and having a predetermined radius with an iris brightness value accumulated in association with the brightness value of the first pixel. When the brightness value of any of the pixels that lie on the circumference of the circle having its center at the first pixel and having the predetermined radius is the same as or similar to the iris brightness value accumulated in association with the brightness value of the first pixel, the extracting unit 131 extracts the first pixel as a candidate of a pixel that lies inside the contour of the pupil. That is, when a first pixel is assumed to be a pixel that lies inside the pupil and that is closer to the contour of the pupil than to the center of the pupil, and a second pixel indicates a feature at a position that lies in the iris and that is close to the contour of the pupil, the extracting unit 131 extracts the first pixel as a candidate of pixels representing the contour of the pupil.

The extracting unit 131 may also extract a candidate of a pixel that lies outside the contour of the pupil, as described below, instead of extracting a candidate of a pixel that lies inside the contour of the pupil. For example, when the brightness value of a first pixel is accumulated in the accumulation unit 12 as the brightness value of the iris, the extracting unit 131 compares the brightness value of each of pixels that lie on the circumference of a circle having its center at the first pixel and having a predetermined radius with a pupil brightness value accumulated in association with the brightness value of the first pixel. When the brightness value of any of the pixels that lie on the circumference of the circle having its center at the first pixel and having the predetermined radius is the same as or similar to the pupil brightness value accumulated in association with the brightness value of the first pixel, the extracting unit 131 extracts the first pixel as a candidate of a pixel that lies outside the contour of the pupil. That is, when a first pixel is assumed to be a pixel located at a position that lies in the iris and that is close to the contour of the pupil, and a second pixel indicates a feature at a position that is close to the contour of the pupil, the extracting unit 131 extracts the first pixel as a candidate of pixels representing the contour of the pupil.

The extracting unit 131 may also extract a candidate of a pixel that lies outside the contour of the pupil, together with a candidate of a pixel that lies inside the contour of the pupil, from the eye region determined to be influenced by reflection light.

Figure 12:
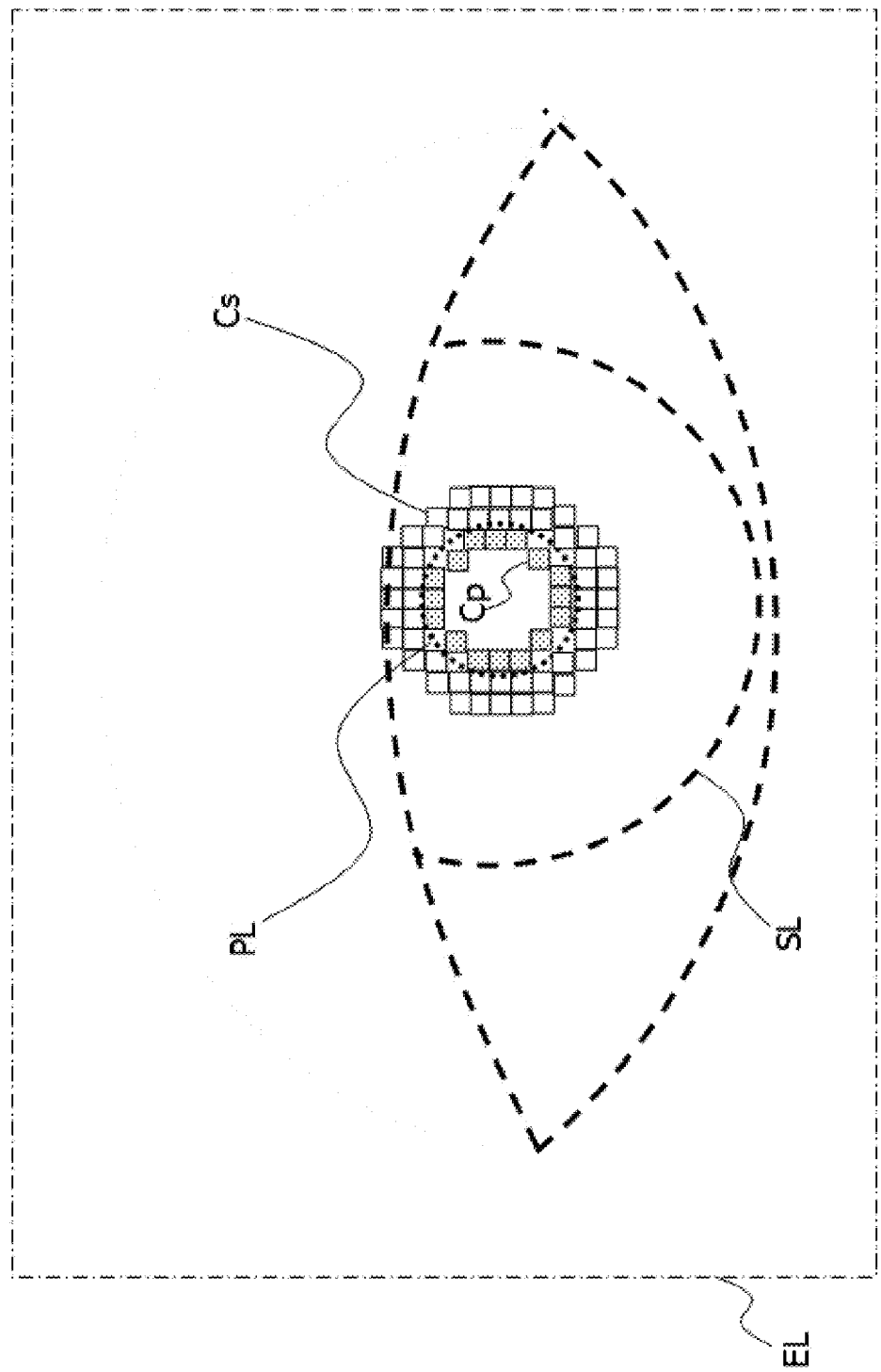
FIG. 12 illustrates an example of candidates of pixels representing the contour of the pupil extracted by the extracting unit illustrated in FIG. 9.

FIG. 12 illustrates an example of candidates of pixels representing the contour of the pupil extracted by the extracting unit 131 illustrated in FIG. 9. Of the elements illustrated in FIG. 12, elements that are equivalent to those illustrated in FIG. 11 are denoted by the same reference characters, and descriptions thereof may be omitted hereinafter. In FIG. 12, graphics denoted by dashed lines are graphics for indicating the positional relationship between pixels extracted from the eye region EL by the extracting unit 131 illustrated in FIG. 9 and the contours of the eyelid and the iris, and are not included in an image indicating candidates of pixels.

In the example in FIG. 12, rectangles Cp indicated by hatching represent pixels extracted by the extracting unit 131 as candidates of pixels included in an inner side of the contour of the pupil, the candidates being included in candidates of pixels representing the contour of the pupil. In the example in FIG. 12, white rectangles Cs represent pixels extracted by the extracting unit 131 as candidates of pixels included in an outer side of the contour of the pupil, the candidates being included in the candidates of the pixels representing the contour of the pupil.

As may be seen from FIG. 12, the pixels Cp and the pixels Cs extracted by the extracting unit 131 as candidates of pixels representing the contour of the pupil are distributed in the eye region EL to have a circle shape similar to the contour of the pupil.

Accordingly, the position locating unit 132 illustrated in FIG. 9 detects a pixel candidate set having a shape that is the same as or similar to the shape of a feature portion, among pixel candidates extracted by the extracting unit 131, and locates, as the position of the feature portion, the positions of the pixels included in the detected pixel candidate set.

For example, the position locating unit 132 detects a portion where the pixel candidates Cp illustrated in FIG. 12 are distributed in the shape of a circle, determines the contour of the pupil as a circle that fits to the boundary between the detected portion and the outer side of the detected portion, and locates the center of the determined circle as the center of the pupil.

The position locating unit 132 may also detect a portion where the pixel candidates Cs illustrated in FIG. 12 are distributed in a circular shape, determine, as the contour of the pupil, a circle that fits to the boundary between the detected portion and the inner side of the detected portion, and locate the center of the determined circle as the center of the pupil.

The position locating unit 132 may also detect a portion where the pixel candidates Cp and the pixel candidates Cs are distributed in a concentric pattern and determine, as the contour of the pupil, a circle that is included in the detected portion and that fits to the boundary between a region corresponding to the pixel candidates Cp and a region corresponding to the pixel candidates Cs.

As described above, the extracting unit 131 illustrated in FIG. 9 uses features in images of the pupil influenced by reflection light having various strengths, the features being accumulated in the accumulation unit 12, to thereby extract candidates of pixels representing the contour of the pupil. The position locating unit 132 then detects, from the pixel candidates extracted by the extracting unit 131, a pixel candidate set having a shape similar to the contour of the pupil, to thereby make it possible to locate the position of the pupil in the eye region determined to be influenced by the reflection light.

In this case, when the brightness of a first pixel and the brightness of a second pixel having a predetermined positional relationship with the first pixels, the first and second pixels being pixels in the eye region, indicate a feature in an image in the vicinity of the contour of the pupil influenced by reflection light, the extracting unit 131 extracts the first and second pixels as candidates of pixels representing the contour of the pupil. Thus, even when the strengths of the influences of reflection light are uneven in the eye region, the extracting unit 131 may thoroughly extract the pixel candidates Cp internally indicating the contour of the pupil or the pixel candidates Cs externally indicating the contour of the pupil. By checking the distribution of, in the eye region, the pixel candidates thoroughly extracted by the extracting unit 131, the position locating unit 132 may detect a probable pupillary contour.

The positions of the pupils detected from both of the eye regions in the past may also be used to locate the position of the pupil in an eye region determined to be influenced by reflection light. Now, a description will be given of a method for locating the position of the pupil in an eye region determined to be influenced by reflection light, based on the positions of the pupil and a Purkinje image detected by the feature detecting device CDT in the past.

Figure 13:
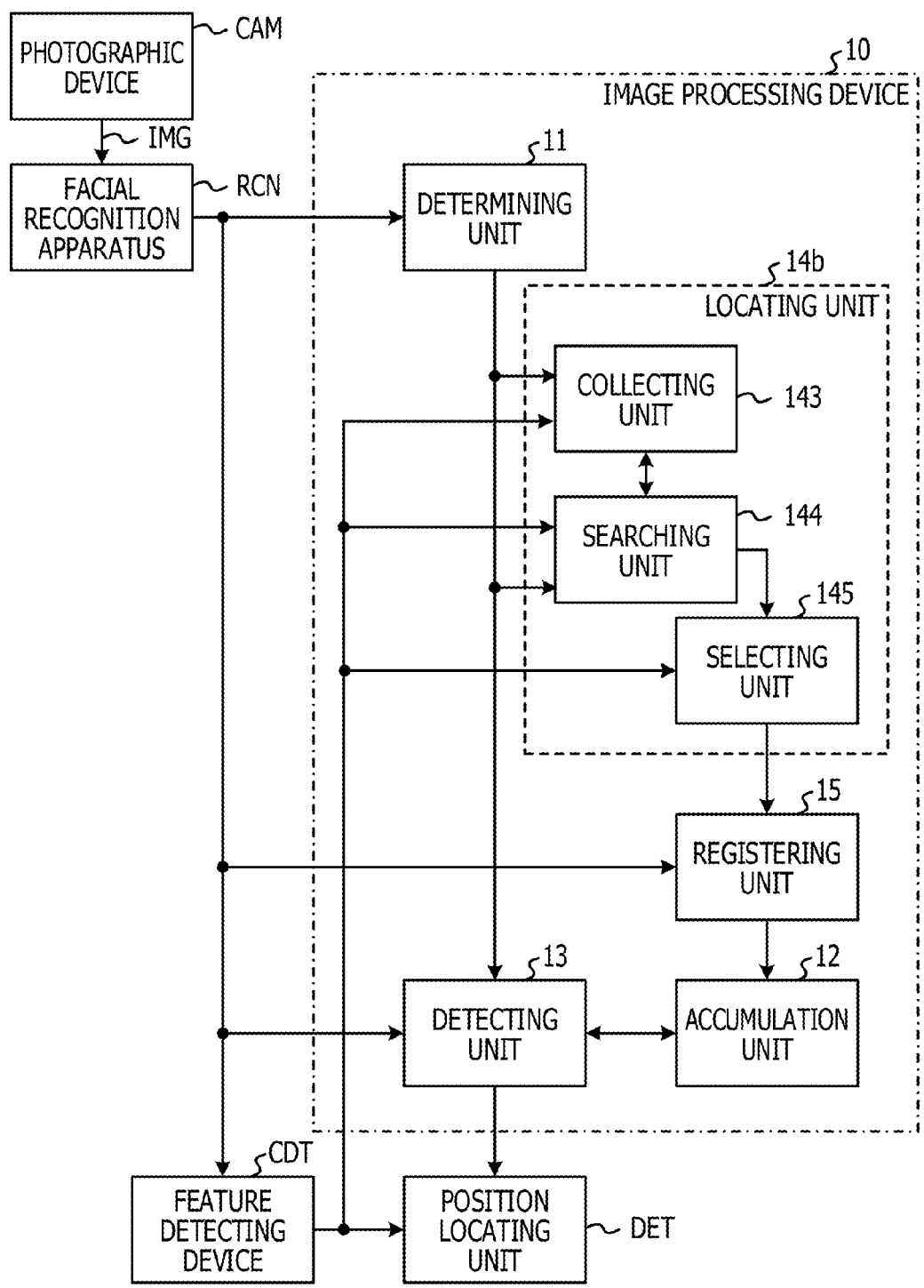
FIG. 13 illustrates another embodiment of the image processing device.

FIG. 13 illustrates another embodiment of the image processing device 10. Of the constituent elements illustrated in FIG. 13, constituent elements that are equivalent to those illustrated in FIG. 1 or 9 are denoted by the same reference numerals, and descriptions thereof may be omitted hereinafter.

A locating unit 14b illustrated in FIG. 13 includes a collecting unit 143, a searching unit 144, and a selecting unit 145. The collecting unit 143 and the searching unit 144 receive a determination result of the determining unit 11 and information indicating the positions of a feature portion and a Purkinje image detected by the feature detecting device CDT. The collecting unit 143 and the searching unit 144 are coupled to each other, and the searching unit 144 is capable of referring to information held in the collecting unit 143. The selecting unit 145 also receives an output of the searching unit 144 and information indicating the position of the Purkinje image detected by the feature detecting device CDT.

Each time the determining unit 11 determines that neither of the eye regions EL and ER is influenced by reflection light, the collecting unit 143 holds therein an association of the positions of feature portions and the positions of Purkinje images that the feature detecting device CDT detected from the respective eye regions EL and ER.

FIG. 14 illustrates an example of the collecting unit 143 illustrated in FIG. 13. The collecting unit 143 illustrated in FIG. 14 includes a column indicating the positions of the right pupil that the feature detecting device CDT detected from the eye region ER as a feature portion and a column indicating the positions of right Purkinje images. The collecting unit 143 illustrated in FIG. 14 further includes a column indicating the positions of the left pupil detected from the eye region EL as a feature portion and a column indicating the positions of left Purkinje images.

In the example in FIG. 14, coordinates (XRp1, YRp1) indicated in the column "position of right pupil" represent an example of the center position of the pupil PR detected from the eye region ER, for example, when it is determined that neither of the eye regions ER and EL illustrated in FIG. 2 is influenced by reflection. Similarly, coordinates (XRr1, YRr1) indicated in the column "position of right Purkinje image" represent an example of the center position of the Purkinje image PrR detected from the eye region ER when it is determined that neither of the eye regions ER and EL illustrated in FIG. 2 is influenced by reflection. Coordinates (XLp1, YLp1) indicated in the column "position of left pupil" represent an example of the center position of the pupil PL detected from the eye region EL when it is determined that neither of the eye regions ER and EL illustrated in FIG. 2 is influenced by reflection. Coordinates (XLr1, YLr1) indicated in the column "position of left Purkinje image" represent an example of the center position of the Purkinje image PrL detected from the eye region EL when it is determined that neither of the eye regions ER and EL illustrated in FIG. 2 is influenced by reflection. In the example in FIG. 14, associations other than the association of the coordinates (XRp1, YRp1), the coordinates (XRr1, YRr1), the coordinates (XLp1, YLp1), and the coordinates (XLr1, YLr1) are not illustrated.

The collecting unit 143 illustrated in FIG. 13 holds an association between the positions of feature portions and Purkinje images detected by the feature detecting device CDT, each time it is determined that neither of the eye regions ER and EL included in an image IMG captured by the photographic device CAM is influenced by reflection light.

Thus, while the photographic device CAM captures, for example, several images IMG per minute over a few tens of seconds, the collecting unit 143 may hold associations in various situations indicated by the relative position of the person Q1 to the display apparatus DSP illustrated in FIG. 1 and the line-of-sight direction of the person Q1.

When it is determined that one of the eye regions ER and EL is influenced by reflection light, the searching unit 144 receives information including the coordinates of the positions of the pupil and a Purkinje image that the feature detecting device CDT detected from the eye region determined not to be influenced by the reflection light. For example, when it is determined that the eye region EL is influenced by reflection light and the eye region ER is not influenced by reflection light, as illustrated in FIG. 7, the searching unit 144 receives information indicating the positions of the pupil and a Purkinje image that the feature detecting device CDT detected from the eye region ER.

The searching unit 144 then searches for, in the associations held in the collecting unit 143, associations including the positions of the pupil and the Purkinje images detected from the eye region determined not to be influenced by reflection light.

In this case, when associations in various situations have already been held in the collecting unit 143, it may be regarded that associations collected in situations similar to that when the image IMG illustrated in FIG. 2 is captured and in a state in which neither of the eye regions ER and EL is influenced by reflection are held in the collecting unit 143. Thus, an association including information indicating the position of the pupil in the eye region EL influenced by reflection light may be found from among the associations searched in the collecting unit 143 based on the pupil PR and the Purkinje image PrR detected from the eye region ER. For example, when an association including the coordinates representing the position of a Purkinje image detected from the eye region EL influenced by reflection light is detected from among the associations obtained by the searching in the collecting unit 143, it may be regarded that the position of the position of the left pupil included in the detected association is the position of the pupil PL in the eye region EL.

Accordingly, when it is determined that one of the eye regions is influenced by reflection light, the selecting unit 145 illustrated in FIG. 13 receives information including the coordinates representing the position of a Purkinje image that the feature detecting device CDT detected from the eye region determined to be influenced by reflection light. Next, the selecting unit 145 detects, from among the associations that the searching unit 144 found from the collecting unit 143, an association including the coordinates representing the position of the Purkinje image received from the feature detecting device CDT. Then, by using the detected association, the selecting unit 145 locates the position of the pupil in the eye region determined to be influenced by reflection light and outputs the located position as a pupil position obtained by the locating unit 14b.

Figure 15:
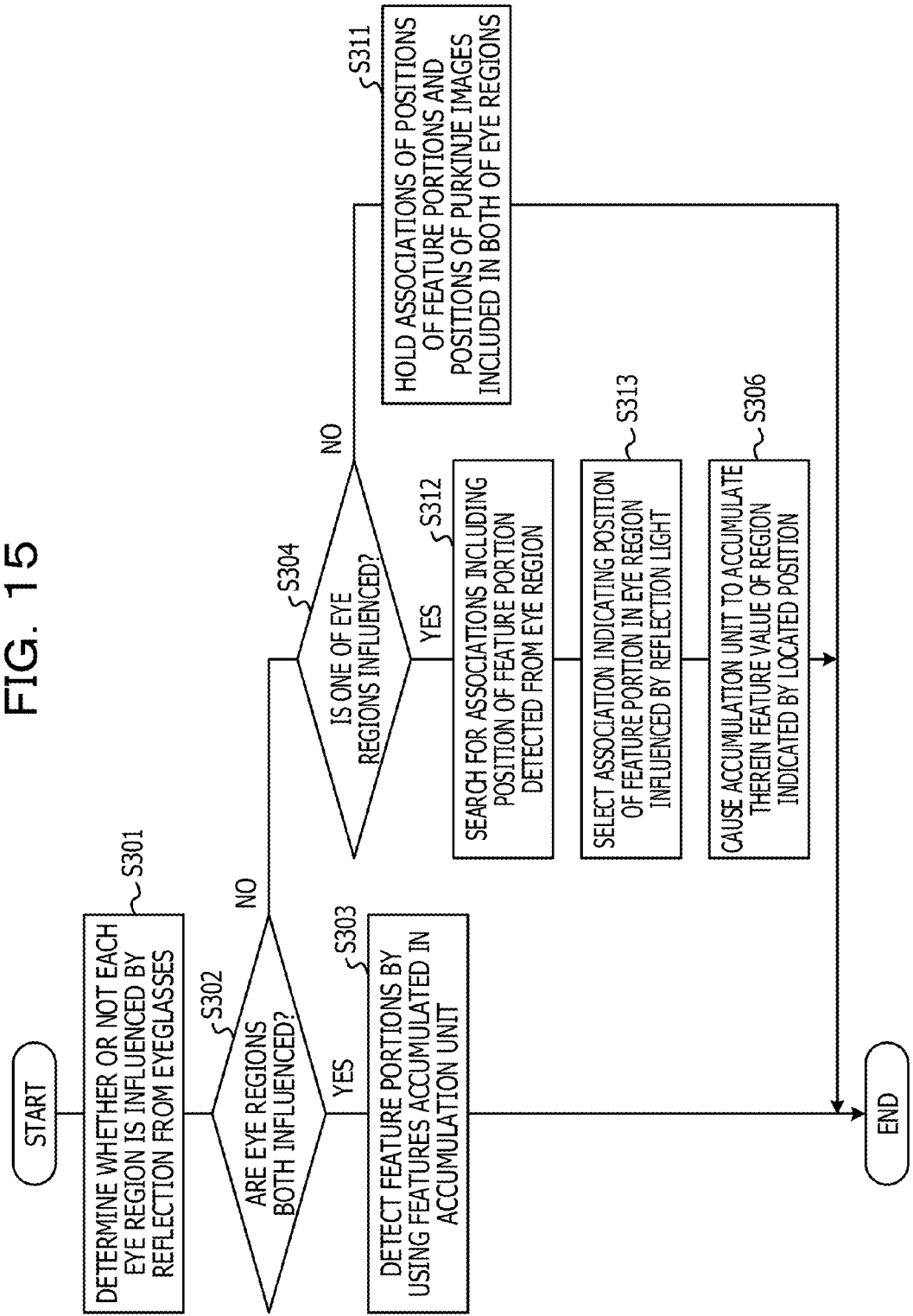
FIG. 15 illustrates the operation of the image processing device illustrated in FIG. 13.

FIG. 15 illustrates the operation of the image processing device 10 illustrated in FIG. 13. Of steps illustrated in FIG. 15, steps that are equivalent to those illustrated in FIG. 8 are denoted by the same reference numerals, and descriptions thereof may be omitted hereinafter. For example, the processor included in the image processing device 10 executes the image processing program to thereby realize the processing illustrated in FIG. 15. Hardware included in the image processing device 10 may also execute the processing illustrated in FIG. 15.

The image processing device 10 illustrated in FIG. 13 executes a process in step S311 as a process for a negative determination (NO) route from step S304 illustrated in FIG. 15.

In step S311, the collecting unit 143 illustrated in FIG. 13 collects associations of the positions of feature portions and the positions of Purkinje images that the feature detecting device CDT detected from the eye regions EL and ER and holds the collected associations, as illustrated in FIG. 14.

In a process for an affirmative determination (YES) route from step S304 illustrated in FIG. 15, the image processing device 10 illustrated in FIG. 13 executes processes in steps S312 and S313, instead of the process in step S305 illustrated in FIG. 8.

In step S312, the searching unit 144 illustrated in FIG. 13 searches for, in the associations held in the collecting unit 143, associations including the position of the feature portion detected from the eye region that is not influenced by reflection light.

In step S313, the selecting unit 145 illustrated in FIG. 13 selects, from among the associations found in the process in step S312, an association including the position of the Purkinje image detected from the eye region determined to be influenced by reflection light. The selecting unit 145 then passes the position of the feature portion included in the selected association to the registering unit 15.

As described above, when one of the eye regions ER and EL is influenced by reflection light, the locating unit 14b illustrated in FIG. 13 may locate the position of the pupil in the eye region influenced by reflection light, by using associations collected each time it is determined that neither of the eye regions ER and EL is influenced by reflection light.

The selecting unit 145 illustrated in FIG. 9 may also perform processing for performing circular-pattern search on a region including a feature-portion position included in the association selected by the searching unit 142, to thereby improve the accuracy for locating the position of the pupil in the eye region influenced by reflection light.

In addition, by using the associations held in the collecting unit 143, the selecting unit 145 may also evaluate a probability of the position of the Purkinje image that the feature detecting device CDT detected from the eye region influenced by reflection light.

In this case, there are cases in which pixels having brightness values that are larger than or equal to a threshold that the feature detecting device CDT uses to detect a Purkinje image are detected from a plurality of portions in the eye region influenced by reflection light. In such cases, the feature detecting device CDT detects, as regions indicating Purkinje images, regions each including the pixels having brightness values that are larger than or equal to the threshold and outputs the center position of each of the detected regions as the position of a Purkinje image.

In this case, the selecting unit 145 may select a probable position of the Purkinje image by matching each position, received from the feature detecting device CDT as the position of a Purkinje image, against the Purkinje image positions included in the associations held in the collecting unit 143. For example, the selecting unit 145 selects, as the position of a probable Purkinje image, a position that is included in a plurality of positions, received from the feature detecting device CDT as the positions of Purkinje images, and that is included in the associations, found from the collecting unit 143 by the searching unit 144, as the position of a Purkinje image. In addition, the selecting unit 145 may also evaluate the probability of each Purkinje image detected by the feature detecting device CDT, based on the degree of similarity between the shape of each of the regions detected by the feature detecting device CDT as Purkinje images and a shape that characterizes a Purkinje image.

Since the selecting unit 145 selects a probable Purkinje image, it is possible to pass the position of the probable Purkinje image to the line-of-sight detecting device DET, even when multiple Purkinje images are detected by the feature detecting device CDT because of the influence of reflection light.

The information accumulated in the accumulation unit 12 may also be used to locate the position of a feature portion included in the eye region influenced by reflection light.

Next, a method in which the information accumulated in the accumulation unit 12 is used to locate the position of a feature portion included in the eye region influenced by reflection light will be described as an example of the image processing device 10 that detects the iris as a feature portion of the eye.

Figure 16:
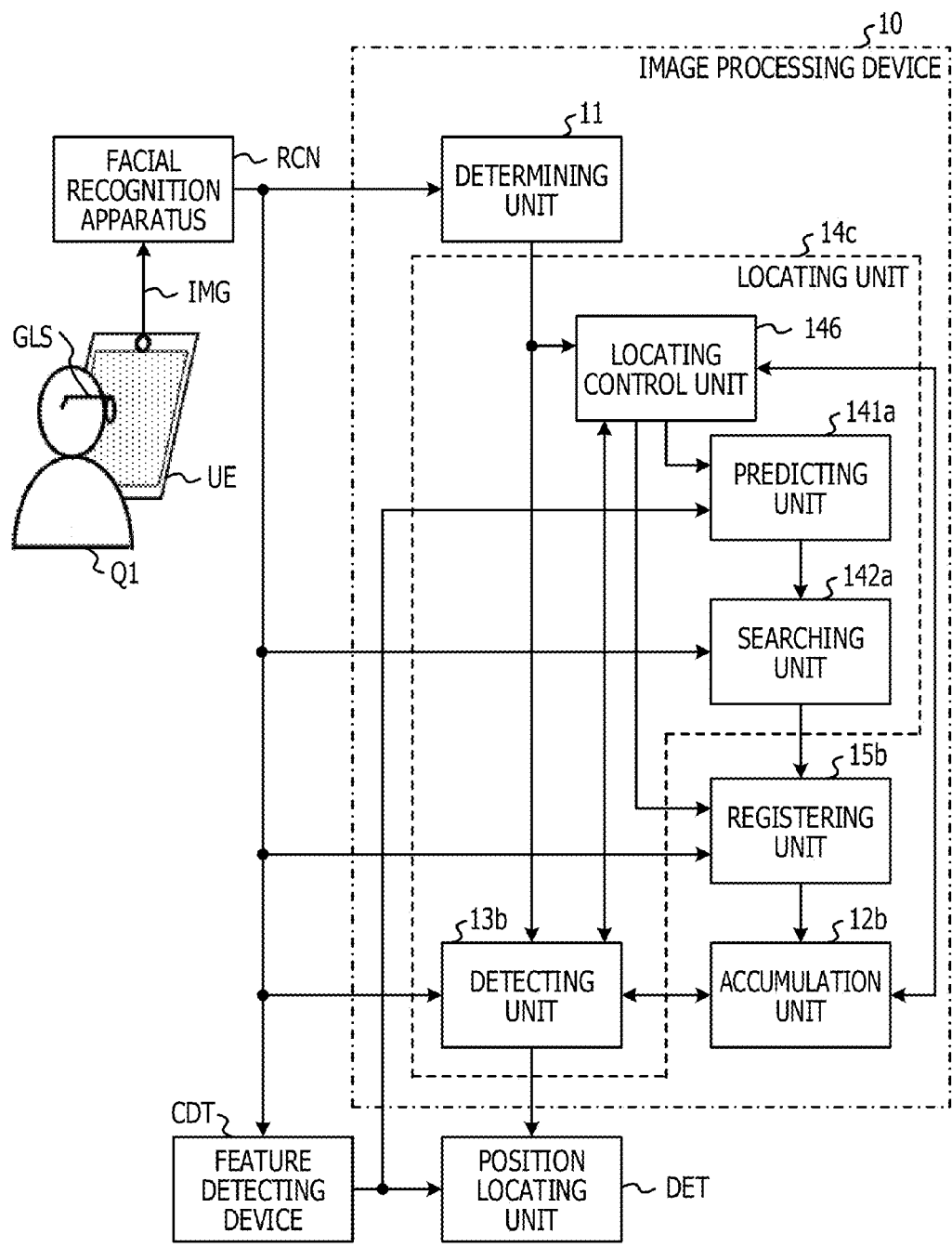
FIG. 16 illustrates another embodiment of the image processing device.

FIG. 16 illustrates another embodiment of the image processing device 10. Of the constituent elements illustrated in FIG. 16, constituent elements that are equivalent to those illustrated in FIG. 9 are denoted by the same reference numerals, and descriptions thereof may be omitted hereinafter.

A photographic device CAM1 illustrated in FIG. 16 is, for example, a camera built into mobile terminal equipment UE, such as a smartphone or tablet terminal, or a vehicle-mounted apparatus. The photographic device CAM1 photographs a predetermined region including the face of the person Q1 at predetermined time intervals and passes resulting color images to the facial recognition apparatus RCN as images IMG. The photographic device CAM1 is not limited to a camera incorporated into mobile terminal equipment and may also be any camera having sensitivity to visible rays. Examples include a camera built into a display unit of a notebook computer apparatus or a camera built into a vehicle-mounted apparatus. When the photographic device CAM1 is implemented by a camera having sensitivity to visible rays, the light source LUM illustrated in FIG. 1 may be omitted.

A locating unit 14c illustrated in FIG. 16 is a constituent element corresponding to the locating unit 14a illustrated in FIG. 9 and includes a predicting unit 141a, a searching unit 142a, and a locating control unit 146. The locating unit 14c locates the position of the iris included in an eye region determined to be influenced by reflection light, as described below.

In the image processing device 10 illustrated in FIG. 16, an image of an eye region extracted from an image IMG by the facial recognition apparatus RCN is passed to a determining unit 11, a registering unit 15b, a detecting unit 13b, and the searching unit 142a. An output of the determining unit 11 is also connected to the detecting unit 13b and the locating control unit 146. The predicting unit 141a also receives, from the feature detecting device CDT, the positions of the iris and a Purkinje image detected from the eye region determined not to be influenced by reflection light and the position of a Purkinje image detected from the eye region determined to be influenced by reflection light.

An accumulation unit 12b is a constituent element corresponding to the accumulation unit 12 illustrated in FIG. 9. Features in images of the iris and the sclera (that is, the white of the eye) are accumulated in the accumulation unit 12b as features in images of feature portions influenced by reflection light, for respective strengths of the influences of reflection light which appear in images of the irises of the two eyes of the person Q1.

FIG. 17 illustrates an example of the accumulation unit 12b illustrated in FIG. 16. The accumulation unit 12b illustrated in FIG. 17 includes two columns that store brightness values and chromaticity values indicating features of the iris and two columns that store brightness values and chromaticity values indicating features of the sclera.

In the accumulation unit 12b illustrated in FIG. 17, for example, information including a brightness value Bs1 and chromaticity values Crs1 and Cbs1 of pixels that lie inside the iris SL included in the eye region EL illustrated in FIG. 2 is accumulated as a feature in an image of the iris influenced by reflection light. In the accumulation unit 12b illustrated in FIG. 17, for example, information including a brightness value Bw1 and chromaticity values Crw1 and Cbw1 of pixels included in the sclera surrounding the iris SL in the eye region EL illustrated in FIG. 2 is accumulated as a feature in an image of the iris influenced by reflection light.

Features in images of the iris influenced by reflection light having strengths that are different from that for the features in the image of the iris which are represented by the pair of the brightness value Bs1 and the chromaticity values Crs1 and Cbs1 and the pair of the brightness value Bw1 and the chromaticity values Crw1 and Cbw1 are not illustrated in FIG. 17.

The detecting unit 13b is a constituent element corresponding to the detecting unit 13a illustrated in FIG. 9. The detecting unit 13b detects, as an iris, a region including pixels having features that are the same as or similar to the iris feature accumulated in the accumulation unit 12b, among pixels included in the eye region determined to be influenced by reflection light.

The registering unit 15b is a constituent element corresponding to the registering unit 15a illustrated in FIG. 9. The registering unit 15b extracts features in an image in a region indicated by the iris position located by the locating unit 14c and causes the accumulation unit 12b to accumulate the extracted features therein. For example, based on the iris center position indicated by the information passed from the locating unit 14c, the registering unit 15b identifies a pixel included in the iris and a pixel included in the sclera in the eye region influenced by reflection light. The registering unit 15b then causes the accumulation unit 12b to accumulate therein, as a feature of the iris influenced by reflection light, the brightness value and the chromaticity values of each of the identified pixels. For example, the registering unit 15b extracts, from the image of the eye region influenced by reflection light, the brightness value and the chromaticity values of a pixel that is away from the center of the iris, located by the locating unit 14c, by a distance that is larger than the radius of the pupil and that is smaller than the radius of the iris. The registering unit 15b then causes the accumulation unit 12b to accumulate therein the extracted brightness value and chromaticity values as a feature of the iris influenced by reflection light. The registering unit 15b also extracts, from the image of the eye region influenced by reflection light, the brightness value and the chromaticity values of a pixel that is apart from the center of the iris, located by the locating unit 14c, by a distance larger than the radius of the iris. The registering unit 15b causes the accumulation unit 12b to accumulate therein the extracted brightness value and chromaticity values as a feature of the sclera influenced by reflection light.

The predicting unit 141a is a constituent element corresponding to the predicting unit 141 illustrated in FIG. 9. The predicting unit 141a predicts the position of the iris included in the eye region determined to be influenced by reflection light, in accordance with an instruction from the locating control unit 146 and based on the information passed from the feature detecting device CDT.

The searching unit 142a is a constituent element corresponding to the searching unit 142 illustrated in FIG. 9. The searching unit 142a locates the position of the iris included in an eye region determined to be influenced by reflection light, by searching for a circular pattern in a predetermined region including the position predicted by the predicting unit 141a. An output of the searching unit 142a is passed to the registering unit 15b and the line-of-sight detecting device DET as an output of the locating unit 14c.

The locating control unit 146 and the accumulation unit 12b are coupled to each other, and when the amount of information accumulated in the accumulation unit 12b is smaller than or equal to a predetermined threshold, the locating control unit 146 instructs the predicting unit 141a to execute processing for predicting the position of the irises included in the eye regions. On the other hand, when the amount of information accumulated in the accumulation unit 12b exceeds the predetermined threshold, the locating control unit 146 uses the detecting unit 13b to detect the irises and passes information indicating the positions of the detected irises to the registering unit 15b. In the example in FIG. 16, when it is determined that the eye regions EL and ER are both influenced by reflection light, the detecting unit 13b detects feature portions included in the eye regions EL and ER and also operates as a constituent element included in the locating unit 14c in response to an instruction from the locating control unit 146.

Each time it is determined that one of the eye regions ER and EL is influenced by reflection light, the registering unit 15b illustrated in FIG. 16 causes the accumulation unit 12b to accumulate therein, as features of the iris, the brightness values and the chromaticity values of pixels included in the iris and the sclera in the eye region influenced by reflection light.

Thus, when the strength of reflection light by which the eye regions ER and EL are influenced changes to various levels during the process of capturing a large number of images IMG, features of the iris influenced by the reflection light having various strengths are accumulated in the accumulation unit 12b. As described above with reference to FIG. 11, the registering unit 15b may cause the accumulation unit 12b to accumulate therein associations of the brightness values and the chromaticity values of a plurality of pixels included in each of the iris and the sclera and located in a plurality of regions in the vicinity of the contour of the iris.

After the features of the iris and the sclera influenced by reflection light having various strengths are accumulated in the accumulation unit 12b, it is possible to use the iris features, accumulated in the accumulation unit 12b, to locate the position of the iris in the eye region determined to be influenced by reflection light.

Figure 18:
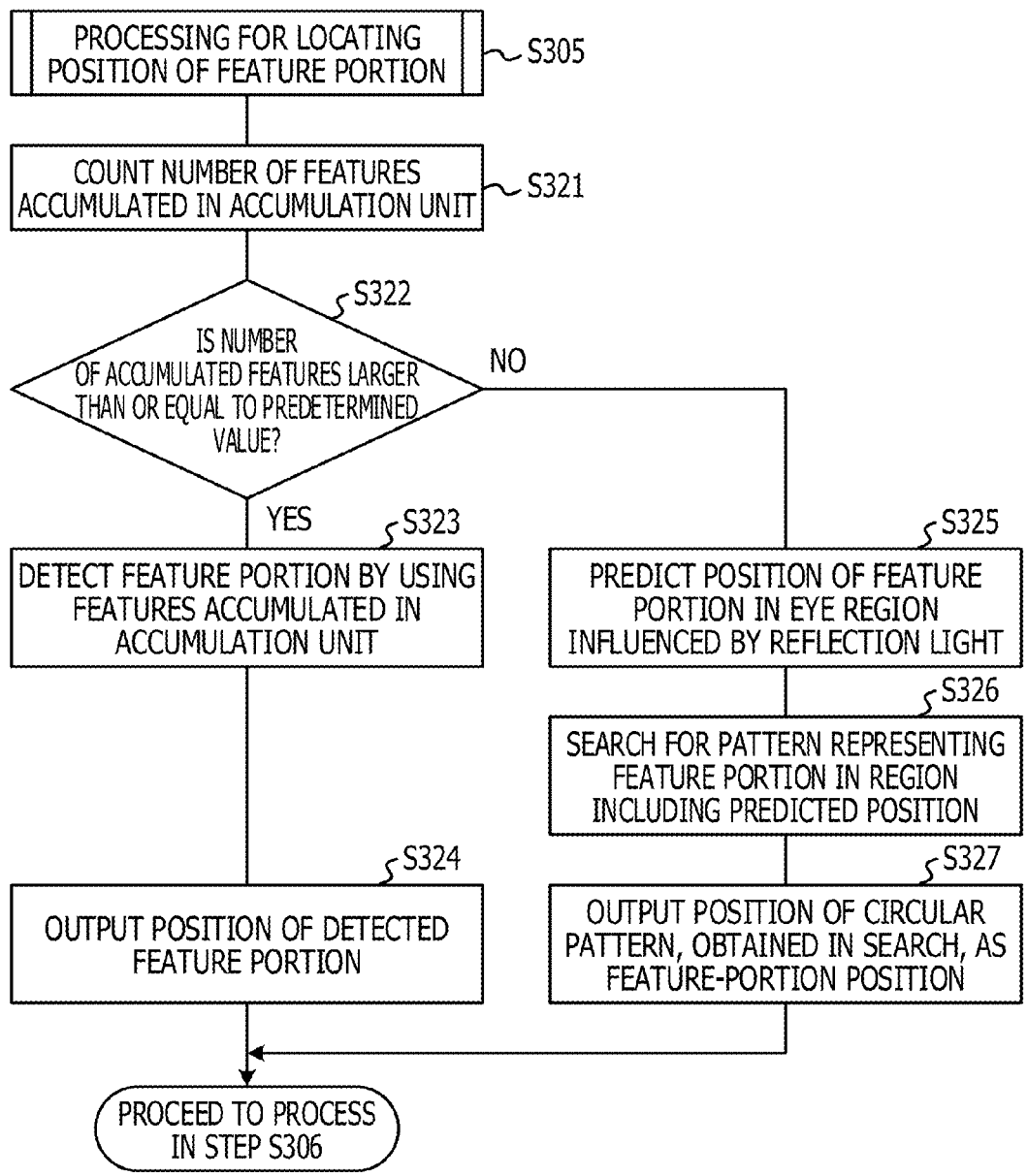
FIG. 18 illustrates the operation of a locating unit illustrated in FIG. 16.

FIG. 18 illustrates the operation of the locating unit 14c illustrated in FIG. 16. Processes in steps S321 to S327 illustrated in FIG. 18 are examples of the process for locating the position of the feature portion in step S305 in FIG. 8. For example, the processor included in the image processing device 10 executes the image processing program to thereby realize the processing illustrated in FIG. 18. Hardware included in the image processing device 10 may also execute the processing illustrated in FIG. 18.

In step S321, by referring to the accumulation unit 12b, the locating control unit 146 illustrated in FIG. 16 counts the number of features accumulated in the accumulation unit 12b. For example, the locating control unit 146 may count the number of features including mutually different values as brightness values of the iris and may regard a numerical value resulting from the counting as the number of features accumulated in the accumulation unit 12b.

In step S322, the locating control unit 146 compares the count result obtained in the process in step S321 with a predetermined value to thereby determine whether or not the number of features accumulated in the accumulation unit 12b is larger than or equal to the predetermined value. It is desirable that the predetermined value compared with the count result obtained in step S321 be set to, for example, a value corresponding to the number of mutually different brightness values assumed to be the brightness values of the iris influenced by reflection light.

If the number of features accumulated in the accumulation unit 12b is larger than or equal to the predetermined value (affirmative determination (YES) in step S312), the locating control unit 146 determines that features of the iris influenced by reflection light whose influence is equivalent to that on the iris included in the eye region influenced by reflection light are accumulated in the accumulation unit 12b. In this case, in step S323, the locating control unit 146 executes processing for detecting the iris by using the detecting unit 13b illustrated in FIG. 16.

In step S323, the detecting unit 13b detects the contour of the iris indicated by the iris features accumulated in the accumulation unit 12b, for example, as in the pupillary-contour detection processing described above with reference to FIGS. 11, and 12.

In step S324, the locating control unit 146 receives, from the detecting unit 13b, information indicating the iris contour detected in the process in step S323 and outputs the received information as a feature-portion position obtained by the locating unit 14c.

On the other hand, if the number of features in the accumulation unit 12b is smaller than the predetermined value (negative determination (NO) in step S322), the locating control unit 146 determines that features of the iris influenced by reflection light whose influence is equivalent to that on the iris included in the eye region influenced by reflection light are not accumulated in the accumulation unit 12b. In this case, the process proceeds to step S325 in which the locating control unit 146 executes processing for locating the position of the iris by using the predicting unit 141a and the searching unit 142a illustrated in FIG. 16.

In step S325, the locating control unit 146 causes the predicting unit 141a to execute processing for predicting the position of the iris included in the eye region determined to be influenced by reflection light, as in the pupil position prediction described above with reference to FIGS. 6 and 7. For example, the predicting unit 141a predicts the position of the iris, based on the relative position of the iris to the Purkinje image detected from the eye region determined not to be influenced by reflection light and the position of the Purkinje image detected from the eye region determined to be influenced by reflection light.

In step S326, as in the search for a pattern representing the pupil which was described above with reference FIG. 10, the searching unit 142a searches for, in a predetermined region including the iris position predicted in the process in step S325, a circular pattern representing the iris as a pattern representing a feature portion.

In step S327, the searching unit 142a determines the center position of the circular pattern obtained in the search processing performed in step S326 and outputs the determined position as a feature-portion position obtained by the locating unit 14c.

As described above, when a sufficient number of features are accumulated in the accumulation unit 12b, the locating unit 14c illustrated in FIG. 14 may locate the position of a feature portion in an eye region determined to be influenced by reflection light, by performing the processing using the feature information accumulated in the accumulation unit 12b. Through the processing described above, it is possible to precisely locate the position of the iris, based on an image of the eye region determined to be influenced by reflection light.

As in the iris-position locating described above, it is also possible to locate the position of the pupil, by using pupil features accumulated in the accumulation unit 12 for respective strengths of the influences of reflection light and based on an image of the eye region determined to be influenced by reflection light.

The image processing device 10 disclosed hereinabove may also be realized, for example, using a computer apparatus.

Figure 19:
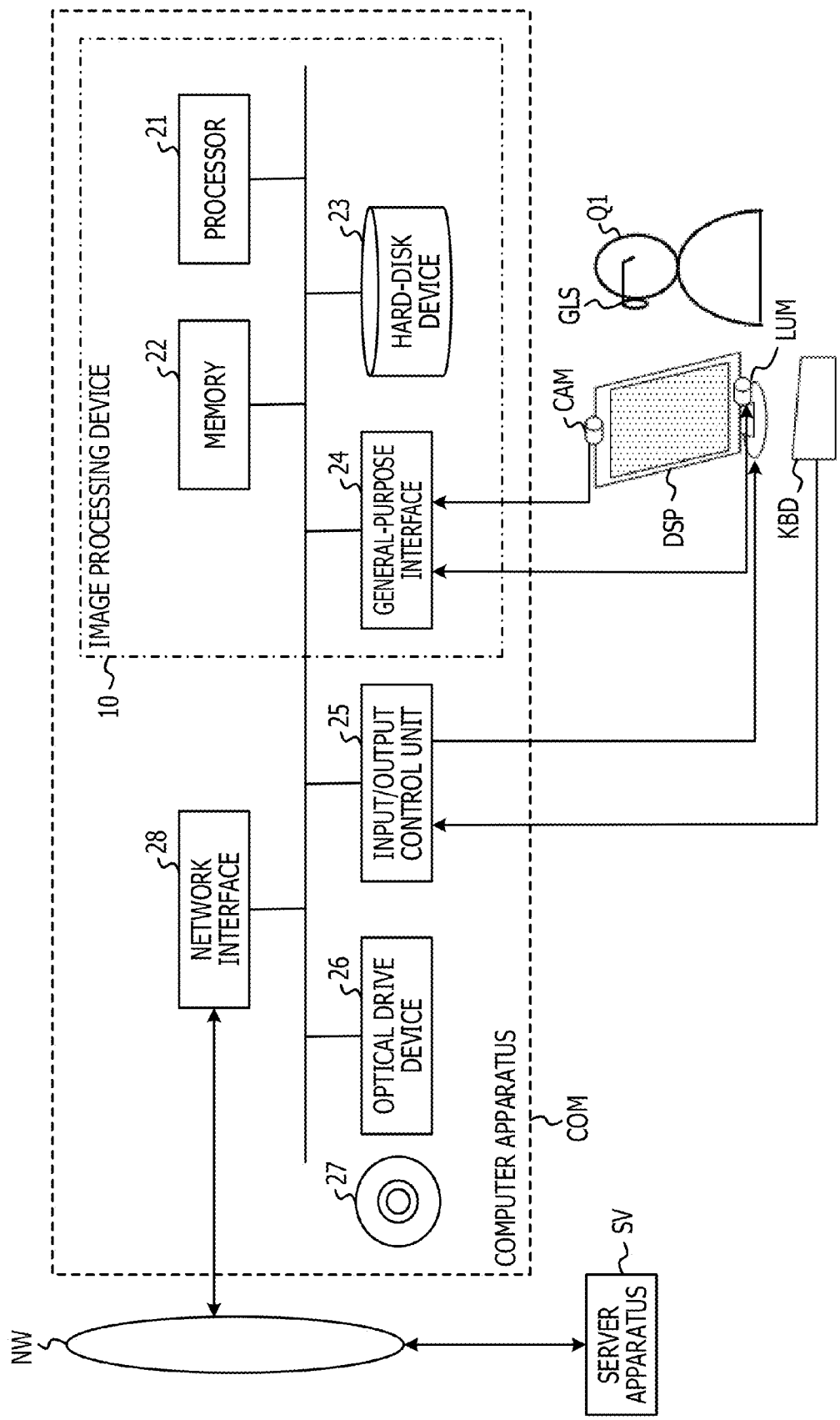
FIG. 19 illustrates an example hardware configuration of the image processing device.

FIG. 19 illustrates an example hardware configuration of the image processing device 10. Of the constituent elements illustrated in FIG. 19, constituent elements that are equivalent to those illustrated in FIG. 1 are denoted by the same reference numerals, and descriptions thereof may be omitted hereinafter.

The computer apparatus COM includes a processor 21, a memory 22, a hard-disk device 23, a general-purpose interface 24, an input/output control unit 25, an optical drive device 26, and a network interface 28. The processor 21, the memory 22, the hard-disk device 23, the general-purpose interface 24, the input/output control unit 25, the optical drive device 26, and the network interface 28 illustrated in FIG. 19 are coupled to each other through a bus. The processor 21, the memory 22, the hard-disk device 23, and the general-purpose interface 24 are included in the image processing device 10. The computer apparatus COM illustrated in FIG. 19 is not limited to a desktop computer and may also be a notebook computer or mobile terminal equipment, such as a smartphone or a tablet terminal. The computer apparatus COM may be a vehicle-mounted apparatus, such as a car navigation system.

The computer apparatus COM and the display apparatus DSP are coupled to each other via the input/output control unit 25. The photographic device CAM and the light source LUM, which are fixed to the display apparatus DSP, are coupled to the general-purpose interface 24. The computer apparatus COM is also coupled to an input device, such as a keyboard KBD, via the input/output control unit 25. For example, by operating the keyboard KBD, the person Q1 may input a desired instruction to the computer apparatus COM.

A removable disk 27, such as an optical disk, may be loaded into the optical drive device 26 illustrated in FIG. 19. The optical drive device 26 reads information recorded on the loaded removable disk 27 and records information thereto.

The computer apparatus COM is connected to a network NW, such as the Internet, via the network interface 28 and may transmit/receive information to/from a server apparatus SV connected to the network NW.

The memory 22 illustrated in FIG. 19 stores therein an operating system of the computer apparatus COM and application programs for the processor 21 to execute the processing illustrated in FIG. 5 or 9 and the facial recognition processing. It is also desirable that the memory 22 store therein an application program for causing the processor 21 to execute the feature detection processing performed by the feature detecting device CDT illustrated in FIG. 1. In addition, the memory 22 may also store therein an application program for processing for detecting the line-of-sight direction of the person Q1 based on the feature-portion positions located in the processing illustrated in FIG. 5 or 9 and the positions of the Purkinje image detected in the feature detection processing. The application programs for executing the processing illustrated in FIG. 5 or 9, the facial recognition processing, the feature detection processing, and the line-of-sight direction detection processing may be recorded to, for example, the removable disk 27, such as optical disk, for distribution. Then, the application programs for executing the above-described multiple types of processing may also be stored in the memory 22 and the hard-disk device 23 by loading the removable disk 27 into the optical drive device 26 and performing read processing. The application programs for executing the above-described multiple types of processing may also be downloaded from the server apparatus SV to the memory 22 and the hard-disk device 23 via the network interface 28 illustrated in FIG. 19.

The processor 21 then executes the application programs stored in the memory 22 to thereby realize the functions of the facial recognition apparatus RCN, the feature detecting device CDT, and the line-of-sight detecting device DET, as well as the functions of the determining unit 11, the detecting unit 13, the locating unit 14, and the registering unit 15 illustrated in FIG. 6. The functions of the accumulation unit 12 illustrated in FIG. 1 are realized using part of a storage area in the memory 22 or the hard-disk device 23.

That is, the image processing device 10 disclosed herein may be realized by, for example, cooperation of the processor 21, the memory 22, the hard-disk device 23, and the general-purpose interface 24 included in the computer apparatus COM illustrated in FIG. 19.

For example, each time an image IMG is received via the general-purpose interface 24, the processor 21 executes the application program for the facial recognition processing to extract the eye regions EL and ER corresponding to both eyes of the person Q1 included in the image IMG. Then, each time the eye regions EL and ER are extracted, the processor 21 executes the application programs for the feature detection processing and the processing illustrated in FIG. 9 to locate the positions of the pupils or irises, included in the eye regions EL and ER as feature portions of human eyes, and the positions of Purkinje images. In addition, the processor 21 executes the application program for the line-of-sight direction detection processing to detect the line-of-sight direction of the person Q1, based on the positions of the identified feature portions and the Purkinje images.

As described above, each time the photographic device CAM photographs the person Q1, the image processing device 10 included in the computer apparatus COM illustrated in FIG. 19 may detect the line-of-sight direction of the person Q1, based on the captured image IMG. Thus, for example, when the photographic device CAM photographs the person Q1 at intervals of a few milliseconds to tens of milliseconds, the image processing device 10 illustrated in FIG. 19 may detect the line-of-sight direction of the person Q1 in almost real time. Thus, based on the line-of-sight direction of the person Q1 which is obtained by the image processing device 10, for example, a position on a display screen of the display apparatus DSP and at which the person Q1 gazes may be located in almost real time. That is, the image processing device 10 disclosed herein is useful for realizing a user interface using line-of-sight direction detection.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing device comprising:
a processor; and
a memory which stores a plurality of instructions, which when executed by the processor, cause the processor to execute:
determining whether or not an eye region of a user being detected a line-of-sight in an image resulting from photographing an eye of the user is influenced by reflection light, the eye region being a region of the eye;
acquiring first feature values of a first combination of pixels included in the eye region when it is determined that the eye region is influenced by the reflection light; and
detecting, as a feature portion of the eye that is used for detecting a line-of-sight of the eye, a region that includes one pixel of the first combination when second feature values of a second combination of pixels that is the same as or similar to the first feature values are included in features being accumulated for respective strengths of influences of the reflection light that appear in images of the feature portion of the eye.

2. The device according to claim 1,
wherein the eye region comprises a first eye region that is a region of one of two eyes and a second eye region that is a region of the other eye of the user, and
wherein the instructions further comprises
locating, when it is determined that the first eye region is influenced by the reflection light and the second eye region is not influenced by the reflection light, a position of a feature portion included in the first eye region, based on a positional relationship between a feature portion and a purkinje image included in the second eye region and a position of a purkinje image included in the first eye region; and
extracting a feature in an image of a region indicated by the feature-portion position located in the locating, and accumulating and registering the extracted feature in the accumulation unit.

3. The device according to claim 2,
wherein the registering accumulates, as features in images of the feature portion included in the first eye region, pairs of feature values of pixels that lie inside the feature portion and feature values of pixels around the feature portion, and wherein the detecting further comprises:
  extracting a first pixel and a second pixel as candidates of pixels representing a contour of the feature portion, when a pair of a feature value of the first pixel and a feature value of the second pixel is accumulated, the first pixel and the second pixel being included in any of the first eye region and the second eye region, and the second pixel lying at a predetermined distance from the first pixel; and
  detecting, from the extracted candidates of the pixels representing the contour, a pixel candidate set having a shape that is the same as or similar to a shape of the feature portion, and locating, as a position of the feature portion, a position of the pixels included in the detected pixel candidate set.

4. The device according to claim 2,
wherein the locating further comprises:
determining a position where the feature portion corresponding to a purkinje image detected from the first eye region is predicted to exist, based on a relative position of the feature portion to a purkinje image, the feature portion and the purkinje image being detected from the second eye region; and
searching for, in a predetermined region that is included in the first eye region and that includes the position determined by the determining, a pattern having a shape similar to a shape of the feature portion detected from the second eye region, and
wherein the locating locates, as the position of the feature portion included in the first eye region, a position of the pattern detected by the searching.

5. The device according to claim 2,
wherein the locating further comprises:
  holding and collecting, when the determining determines that neither the first eye region nor the second eye region is influenced by the reflection light, associations of positions of purkinje images and positions of feature portions, the purkinje images and the feature portions being detected from the first eye region and the second eye region;
searching for, in the associations held by the collecting, associations including the positions of the purkinje images and the positions of the feature portion, the purkinje images and the feature portion being detected from the second eye region; and
selecting, from the associations obtained by the searching, an association including information indicating the position of the purkinje image detected from the first eye region, and outputting, as a feature-portion position located in the first eye region, information indicating the position of the feature portion included in the first eye region and included in the selected association.

6. The device according to claim 2,
wherein the locating locates, as the position of the feature portion in the first eye region, a region including a pixel that is included in pixels in the first eye region and that has a feature that is the same as or similar to any of the feature-portion features accumulated.

7. The device according to claim 1, wherein the processor performs line-of-sight detection of the eye using a position of the detected feature portion.

8. An image processing method comprising:
  determining, by a computer processor, whether or not an eye region of a user being detected a line-of-sight in an image resulting from photographing an eye of the user is influenced by reflection light, the eye region being a region of the eye;
  acquiring first feature values of a first combination of pixels included in the eye region when it is determined that the eye region is influenced by the reflection light; and
  detecting, as a feature portion of the eye that is used for detecting a line-of-sight of the eye, a region that includes one pixel of the first combination when second feature values of a second combination of pixels that is the same as or similar to the first feature values are included in the features being accumulated for respective strengths of influences of the reflection light that appear in images of the feature portion of the eye.

9. The method according to claim 8,
wherein the eye region comprises a first eye region that is a region of one of two eyes and a second eye region that is a region of the other eye of the user, and
wherein the method further comprises
  locating, when it is determined that the first eye region is influenced by the reflection light and the second eye region is not influenced by the reflection light, a position of a feature portion included in the first eye region, based on a positional relationship between a feature portion and a purkinje image included in the second eye region and a position of a purkinje image included in the first eye region; and
  extracting a feature in an image of a region indicated by the feature-portion position located in the locating, and accumulating and registering the extracted feature.

10. The method according to claim 9,
wherein the registering accumulates, as features in images of the feature portion included in the first eye region, pairs of feature values of pixels that lie inside the feature portion and feature values of pixels around the feature portion, and
wherein the detecting further comprises:
  extracting a first pixel and a second pixel as candidates of pixels representing a contour of the feature portion, when a pair of a feature value of the first pixel and a feature value of the second pixel is accumulated, the first pixel and the second pixel being included in any of the first eye region and the second eye region, and the second pixel lying at a predetermined distance from the first pixel; and
  detecting, from the extracted candidates of the pixels representing the contour, a pixel candidate set having a shape that is the same as or similar to a shape of the feature portion, and locating, as a position of the feature portion, a position of the pixels included in the detected pixel candidate set.

11. The method according to claim 9,
wherein the locating further comprises:
  determining a position where the feature portion corresponding to a purkinje image detected from the first eye region is predicted to exist, based on a relative position of the feature portion to a purkinje image, the feature portion and the purkinje image being detected from the second eye region; and
  searching for, in a predetermined region that is included in the first eye region and that includes the position determined by the determining, a pattern having a shape similar to a shape of the feature portion detected from the second eye region, and
wherein the locating locates, as the position of the feature portion included in the first eye region, a position of the pattern detected by the searching.

12. The method according to claim 9,
wherein the locating further comprises:
holding and collecting, when the determining determines that neither the first eye region nor the second eye region is influenced by the reflection light, associations of positions of purkinje images and positions of feature portions, the purkinje images and the feature portions being detected from the first eye region and the second eye region;
searching for, in the associations held by the collecting, associations including the positions of the purkinje images and the positions of the feature portion, the purkinje images and the feature portion being detected from the second eye region; and
selecting, from the associations obtained by the searching, an association including information indicating the position of the purkinje image detected from the first eye region, and outputting, as a feature-portion position located in the first eye region, information indicating the position of the feature portion included in the first eye region and included in the selected association.

13. The method according to claim 9,
wherein the locating locates, as the position of the feature portion in the first eye region, a region including a pixel that is included in pixels in the first eye region and that has a feature that is the same as or similar to any of the feature-portion features accumulated.

14. A computer-readable storage non-transitory medium storing an image processing program that causes a computer to execute a process comprising:
determining, by a computer processor, whether or not an eye region of a user being detected a line-of-sight in an image resulting from photographing an eye of the user is influenced by reflection light, the eye region being a region of the eye;
acquiring first feature values of a first combination of pixels included in the eye region when it is determined that the eye region is influenced by the reflection light; and
detecting, as a feature portion of the eye that is used for detecting a line-of-sight of the eye, a region that includes one pixel of the first combination when second feature values of a second combination of pixels that is the same as or similar to the first feature values are included in the features being accumulated for respective strengths of influences of the reflection light that appear in images of the feature portion of the eye.

15. The computer-readable storage non-transitory medium according to claim 14, wherein the eye region comprises a first eye region that is a region of one of two eyes and a second eye region that is a region of the other eye of the user, and wherein the process further comprises
locating, when it is determined that the first eye region is influenced by the reflection light and the second eye region is not influenced by the reflection light, a position of a feature portion included in the first eye region, based on a positional relationship between a feature portion and a purkinje image included in the second eye region and a position of a purkinje image included in the first eye region; and
extracting a feature in an image of a region indicated by the feature-portion position located in the locating, and accumulating and registering the extracted feature.

16. The computer-readable storage non-transitory medium according to claim 15, wherein the registering accumulates, as features in images of the feature portion included in the first eye region, pairs of feature values of pixels that lie inside the feature portion and feature values of pixels around the feature portion, and wherein the detecting further comprises:
extracting a first pixel and a second pixel as candidates of pixels representing a contour of the feature portion, when a pair of a feature value of the first pixel and a feature value of the second pixel is accumulated, the first pixel and the second pixel being included in any of the first eye region and the second eye region, and the second pixel lying at a predetermined distance from the first pixel; and
detecting, from the extracted candidates of the pixels representing the contour, a pixel candidate set having a shape that is the same as or similar to a shape of the feature portion, and locating, as a position of the feature portion, a position of the pixels included in the detected pixel candidate set.

17. The computer-readable storage non-transitory medium according to claim 15, wherein the locating further comprises:
determining a position where the feature portion corresponding to a purkinje image detected from the first eye region is predicted to exist, based on a relative position of the feature portion to a purkinje image, the feature portion and the purkinje image being detected from the second eye region; and
searching for, in a predetermined region that is included in the first eye region and that includes the position determined by the determining, a pattern having a shape similar to a shape of the feature portion detected from the second eye region, and wherein the locating locates, as the position of the feature portion included in the first eye region, a position of the pattern detected by the searching.

18. The computer-readable storage non-transitory medium according to claim 15, wherein the locating further comprises:
holding and collecting, when the determining determines that neither the first eye region nor the second eye region is influenced by the reflection light, associations of positions of purkinje images and positions of feature portions, the purkinje images and the feature portions being detected from the first eye region and the second eye region;
searching for, in the associations held by the collecting, associations including the positions of the purkinje images and the positions of the feature portion, the purkinje images and the feature portion being detected from the second eye region; and
selecting, from the associations obtained by the searching, an association including information indicating the position of the purkinje image detected from the first eye region, and outputting, as a feature-portion position located in the first eye region, information indicating the position of the feature portion included in the first eye region and included in the selected association.

19. The computer-readable storage non-transitory medium according to claim 15, wherein the locating locates, as the position of the feature portion in the first eye region, a region including a pixel that is included in pixels in the first eye region and that has a feature that is the same as or similar to any of the feature-portion features accumulated.

* * * * *